(12) United States Patent
Han et al.

(10) Patent No.: US 11,933,708 B2
(45) Date of Patent: Mar. 19, 2024

(54) AEROSOL-BASED LIQUID PARTICLE DETECTION MEASUREMENT

(71) Applicant: TSI Incorporated, Shoreview, MN (US)

(72) Inventors: Hee-Siew Han, Minneapolis, MN (US); Kenneth R Farmer, II, Lake Elmo, MN (US); Nathan T. Birkeland, Mounds View, MN (US); Richard J. Remiarz, Vadnais Heights, MN (US); Timothy S. Russell, St. Paul, MN (US); William D. Dick, Minneapolis, MN (US)

(73) Assignee: TSI Incorporated, Shoreview, MN (US)

( * ) Notice: Subject to any disclaimer, the term of this patent is extended or adjusted under 35 U.S.C. 154(b) by 0 days.

(21) Appl. No.: 17/675,736

(22) Filed: Feb. 18, 2022

(65) Prior Publication Data

US 2022/0357262 A1    Nov. 10, 2022

Related U.S. Application Data

(60) Provisional application No. 63/225,066, filed on Jul. 23, 2021, provisional application No. 63/185,840, filed on May 7, 2021.

(51) Int. Cl.
*G01N 15/06* (2006.01)
*B01D 39/20* (2006.01)
(Continued)

(52) U.S. Cl.
CPC ......... *G01N 15/06* (2013.01); *B01D 39/2027* (2013.01); *G01F 23/263* (2013.01);
(Continued)

(58) Field of Classification Search
CPC .............. G01N 15/06; G01N 15/0227; G01N 15/0255; G01N 2015/0261; G01N 2015/0693; B01D 39/2027; G01F 23/263
See application file for complete search history.

(56) References Cited

U.S. PATENT DOCUMENTS 5,098,657 A     3/1992  Blackford et al.
6,833,028 B1 * 12/2004  Scheer ................ H01L 21/6715
                                                             118/308
(Continued)

FOREIGN PATENT DOCUMENTS

JP     H05313171 A  * 11/1993
JP     2009120252 A *  6/2009
(Continued)

OTHER PUBLICATIONS

"International Application Serial No. PCT/US2022/017012, International Search Report dated Jun. 3, 2022", 4 pgs.
(Continued)

*Primary Examiner* — Michael A Lyons
*Assistant Examiner* — Omar H Nixon
(74) *Attorney, Agent, or Firm* — Schwegman Lundberg & Woessner, P.A.

(57) ABSTRACT

A measurement system includes an atomizer, an impactor, a particle counter, and a discharge reservoir. The atomizer has a liquid intake port and a gas intake port configured to aerosolize a liquid received at the liquid intake port. The impactor has an inlet coupled to the atomizer and has a first output port and a second output port. The impactor is configured to separate droplets wherein those droplets smaller than a selected cut point are directed to the first output port and those droplets larger than the selected cut point are directed to the second output port. The particle counter is coupled to the first output port and is configured to count particles larger than at least one particle size cut
(Continued)

point. The discharge reservoir is coupled to the second output port.

25 Claims, 19 Drawing Sheets

(51) Int. Cl.
    *G01F 23/263*     (2022.01)
    *G01N 15/02*     (2006.01)

(52) U.S. Cl.
    CPC ..... *G01N 15/0227* (2013.01); *G01N 15/0255* (2013.01); *G01N 2015/0261* (2013.01); *G01N 2015/0693* (2013.01)

(56) References Cited

U.S. PATENT DOCUMENTS

| | | | |
|---|---|---|---|
| 2008/0137065 A1 | 6/2008 | Oberreit et al. | |
| 2008/0186489 A1* | 8/2008 | Ahn | G01N 15/065 356/337 |
| 2009/0183554 A1 | 7/2009 | Grant et al. | |
| 2010/0031734 A1* | 2/2010 | Zhang | G01N 33/18 73/61.43 |
| 2010/0255560 A1* | 10/2010 | Call | G01N 15/0255 435/243 |
| 2011/0214489 A1* | 9/2011 | Grant | G01N 1/4022 73/61.72 |
| 2015/0268140 A1* | 9/2015 | Wang | G01N 33/18 356/335 |
| 2015/0308940 A1 | 10/2015 | Blackford et al. | |
| 2020/0141853 A1* | 5/2020 | Hering | F24F 6/043 |
| 2021/0107830 A1* | 4/2021 | Lake | C04B 14/22 |

FOREIGN PATENT DOCUMENTS

| | | | | |
|---|---|---|---|---|
| KR | 20100041580 A | | 4/2010 | |
| KR | 20210018259 A | * | 2/2021 | ........... G01N 1/2252 |
| WO | WO-2022235318 A1 | | 11/2022 | |

OTHER PUBLICATIONS

"International Application Serial No. PCT/US2022/017012, Written Opinion dated Jun. 3, 2022", 5 pgs.

"International Application Serial No. PCT/US2022/017012, International Preliminary Report on Patentability dated Nov. 16, 2023", 7 pgs.

"Israel Application Serial No. 308365, Office Action dated Dec. 25, 2023".

* cited by examiner

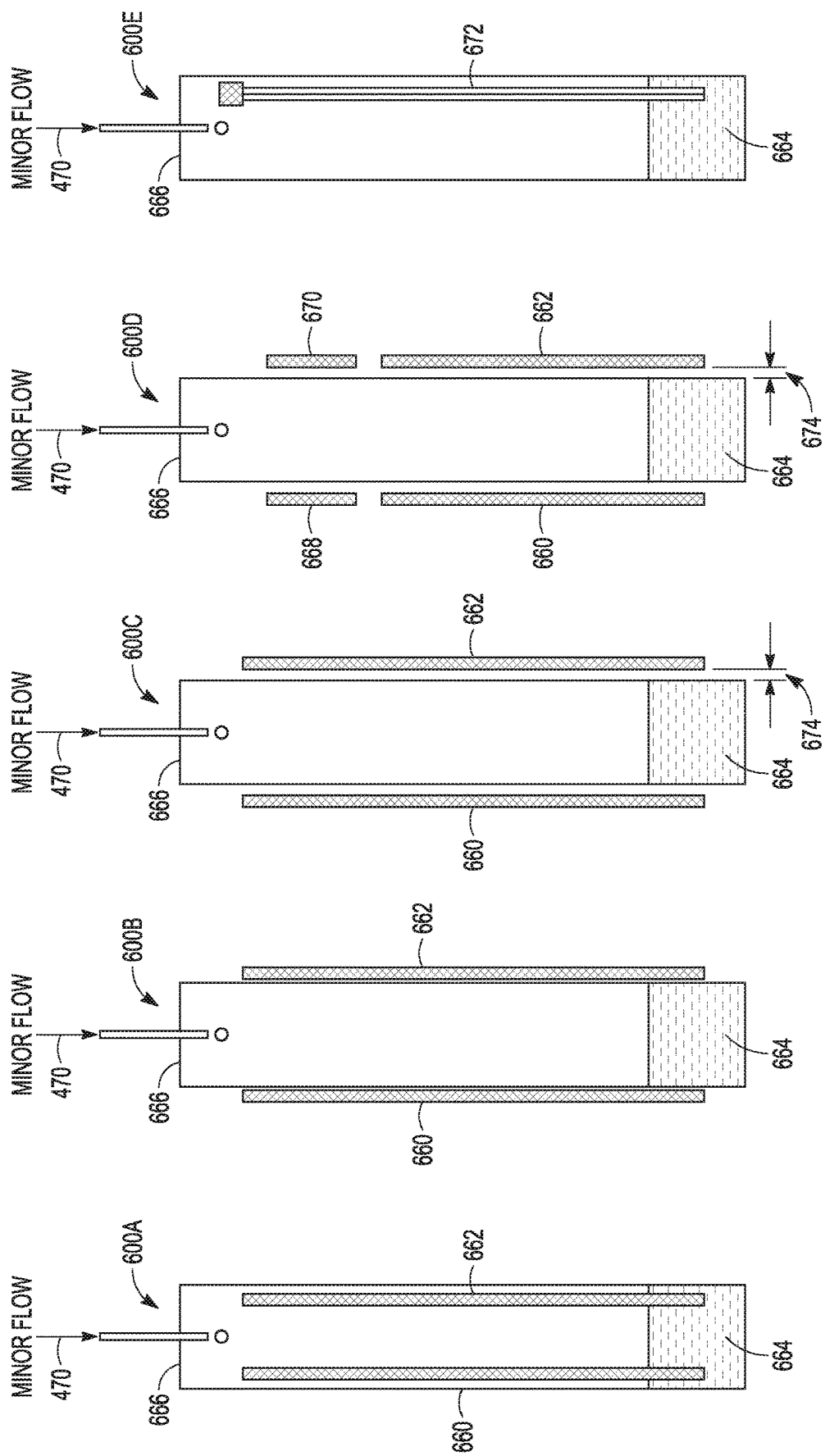

```
1700 ─┐
           ┌─ 1740
  ┌─────────────────────────────────────┐
  │   AEROSOLIZE LIQUID TO MAKE DROPLETS │
  └─────────────────────────────────────┘
                   │
                   ▼         ┌─ 1742
  ┌─────────────────────────────────────┐
  │  SEPARATE DROPLETS USING VIRTUAL IMPACTOR │──┐
  └─────────────────────────────────────┘  │
                   │                        │
                   ▼         ┌─ 1744        │
  ┌─────────────────────────────────────┐  │
  │   EVAP SMALLER DROPLETS TO MAKE PARTICLES │  │
  └─────────────────────────────────────┘  │
                   │                        │
                   ▼         ┌─ 1746        │
  ┌─────────────────────────────────────┐  │
  │          COUNT PARTICLES             │  │
  └─────────────────────────────────────┘  │
                             ┌─ 1748        │
                   ▼◄────────────────────────┘
  ┌─────────────────────────────────────┐
  │        COLLECT LARGER DROPLETS       │
  └─────────────────────────────────────┘
```

FIG. 17

AEROSOL-BASED LIQUID PARTICLE DETECTION MEASUREMENT

RELATED APPLICATION

This application claims the benefit of priority to U.S. Provisional Patent Application No. 63/185,840 titled "Aerosol-Based Liquid Particle Detection Measurement" and filed on May 7, 2021 and to U.S. Provisional Patent Application No. 63/225,066 titled "Aerosol-Based Liquid Particle Detection Measurement" and filed on Jul. 23, 2021, the entire contents of which are hereby incorporated by reference in their entireties.

BACKGROUND

In the semiconductor manufacturing process of integrated circuits (ICs), ultrapure water (UPW) is commonly used to wash processing chemicals from semiconductor wafers. UPW is also used to clean fixtures and tools that aid in handling and transporting the wafers. Commonly, several thousand liters of UPW are used to clean a single semiconductor wafer. Any precursor or solid impurity in the UPW may form residue particles on the semiconductor wafer, resulting in IC yield loss. Yield is defined as the ratio of (i) number of operational products made and (ii) the number of operational products that could have been made. The functionality and reliability of ICs produced by the wafers are typically used as an indicator of the yield of the manufacturing process. Impurities in process liquids other than UPW can have the same or similar influences on yield.

The residue particles are typically referred to as residue after evaporation (RAE) particles. Not all RAE particles affect the yield. A particle size threshold that causes yield-relevant defects is referred to as a "critical particle size" or "killer particle size". The critical particle size is defined by half of a critical dimension in semiconductor devices. As the feature size of the semiconductor devices decreases, so does the critical particle size.

The RAE particles include solid particles and particles formed by particle precursors in the UPW. The solid particles are mainly colloidal silica high molecular weight polymer particles from ion exchange resin, and bacteria. Particles formed by particle precursors are typically referred to as non-volatile residue (NVR) particles. Particle precursors are primarily dissolved or suspended nanomaterials that may form particles on the semiconductor wafer after evaporation. Common particle precursors in UPW include dissolved ionic silica and dissolved and suspended high molecular weight organics rinsed off of ion exchange resins.

Since particle-related defects are a key contributor to the yield loss, and many of these particles are originally from the UPW used in the process, it can be beneficial to monitor, count, measure, or a combination thereof, the UPW RAE particles (as well as those in other process liquids). The measurement provides an indication of the quality and cleanliness of the UPW. A typical UPW monitoring instrument in the semiconductor industry is the liquid optical particle counter (LPC). The size detection limit of the most sensitive commercially available LPCs is typically around 20 nm, but the detection efficiency at this size is only 2-5% or less. This means that most particles at or less than 20 nm remain undetected. Due to a significant signal-to-noise ratio (SNR) issue with LPC light-scattering methods and instrument cost, further improvements based on this optical method become very challenging and perhaps not feasible.

One particle measurement technology relies on aerosol-based liquid particle detection. This kind of measurement system utilizes an aerosol atomization and particle detection measurement technique. The technique first aerosolizes the liquid sample into droplets of a predetermined size distribution. The droplets are dried, and the residue particles are then counted by a particle counter. A condensation particle counter (CPC) is commonly used as a particle detector in this application. Instruments of this nature are described in U.S. Pat. Nos. 4,761,074, 5,098,657 and 7,777,868. These instruments provide detection sensitivity and extend the size detection limit down to smaller than 5 nm.

However, aerosol-based liquid particle detection-based instruments are not widely adopted by the semiconductor industry as an alternative method to the industry standard measurement method LPC. One reason is that the data from the aerosol-based liquid particle detection method is not correlated well to the LPC data.

The discrepancy in particle count between the two measurement methods is significant and can be on the order of 5 or more times. One reason for the discrepancy is that the aerosol-based liquid particle detection method measures a significant amount of NVR particles. These NVR particles are not measured by the LPC method as they are in the dissolved particle precursor form in the UPW and thus are undetectable by the LPC.

SUMMARY

An example of the present subject matter includes an improved particle detection method that reduces the effect of NVR particles on the total particle count.

Each of these non-limiting examples can stand on its own or can be combined in various permutations or combinations with one or more of the other examples.

This overview is intended to provide an overview of subject matter of the present patent application. It is not intended to provide an exclusive or exhaustive explanation of embodiments. The detailed description is included to provide further information about the present patent application.

BRIEF DESCRIPTION OF TIE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

FIGS. 6A, 6B, 6C, 6D, and 6E illustrate respective capacitive sensor configurations.

Figure 7:
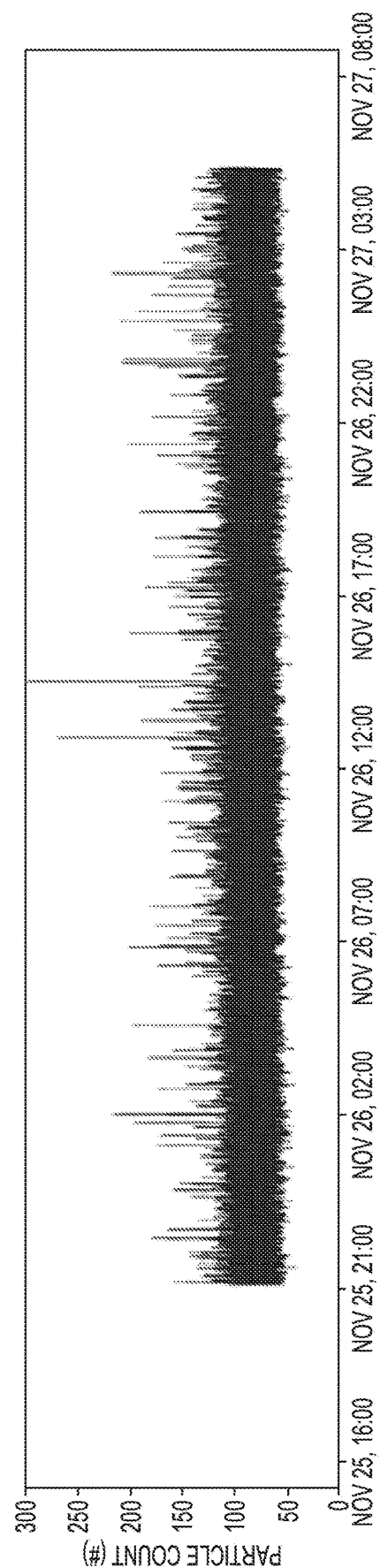

FIG. 7 illustrates residue after evaporation particle count per second from UPW.

Figure 8:
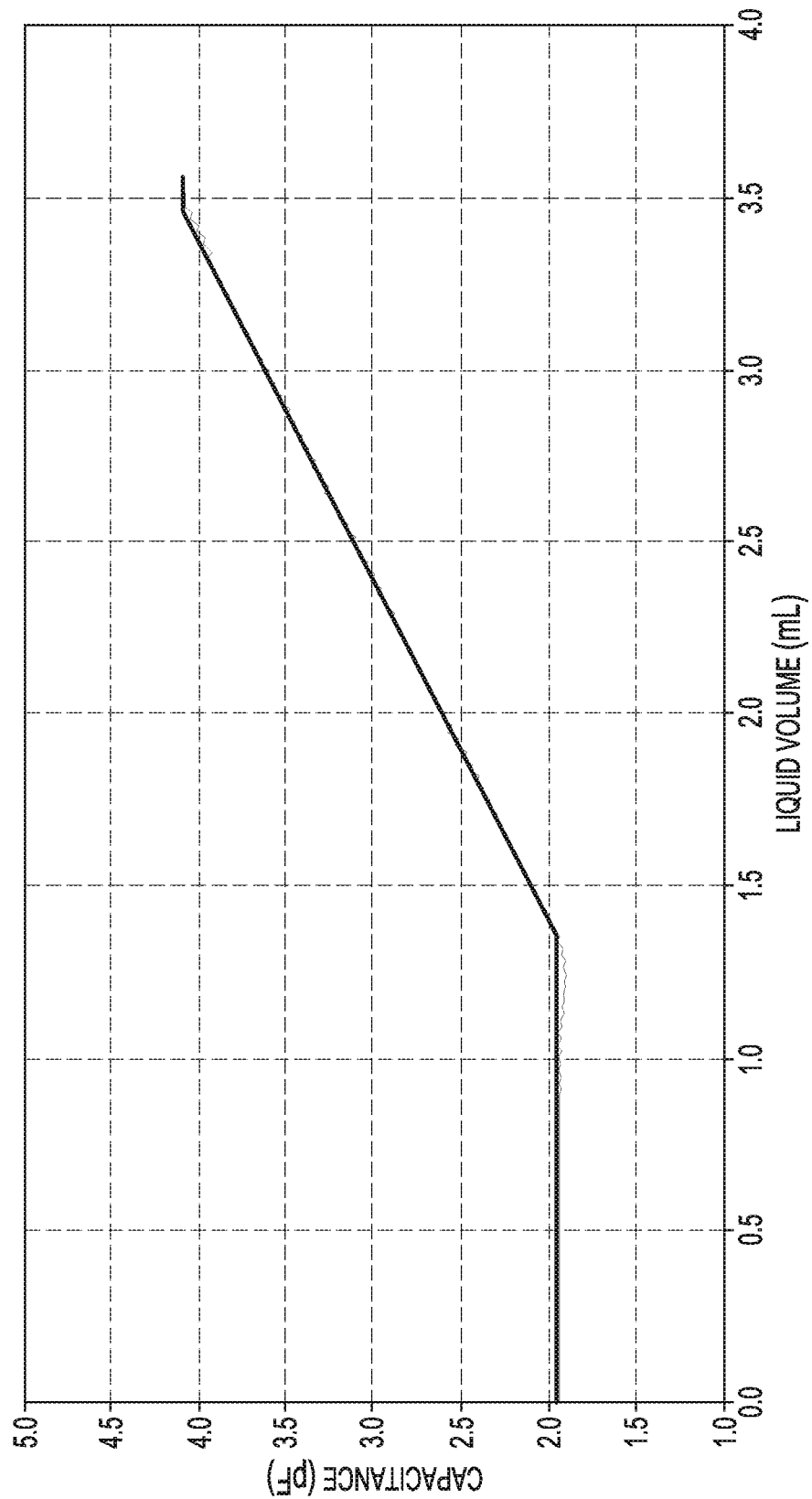

FIG. 8 illustrates a capacitance vs liquid volume calibration curve.

Figure 9:
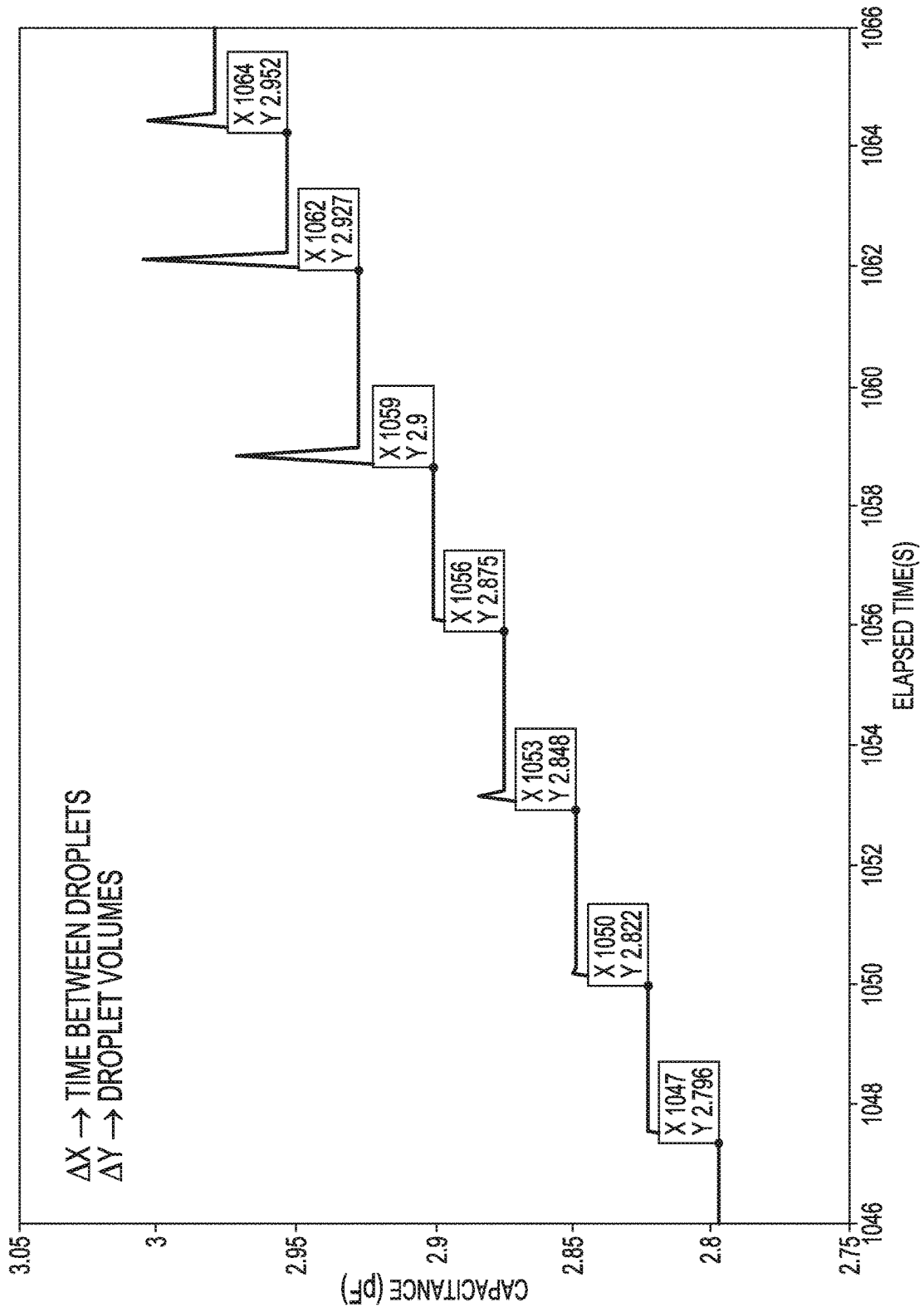

FIG. 9 illustrates sensitivity of a liquid level sensor.

Figure 10:
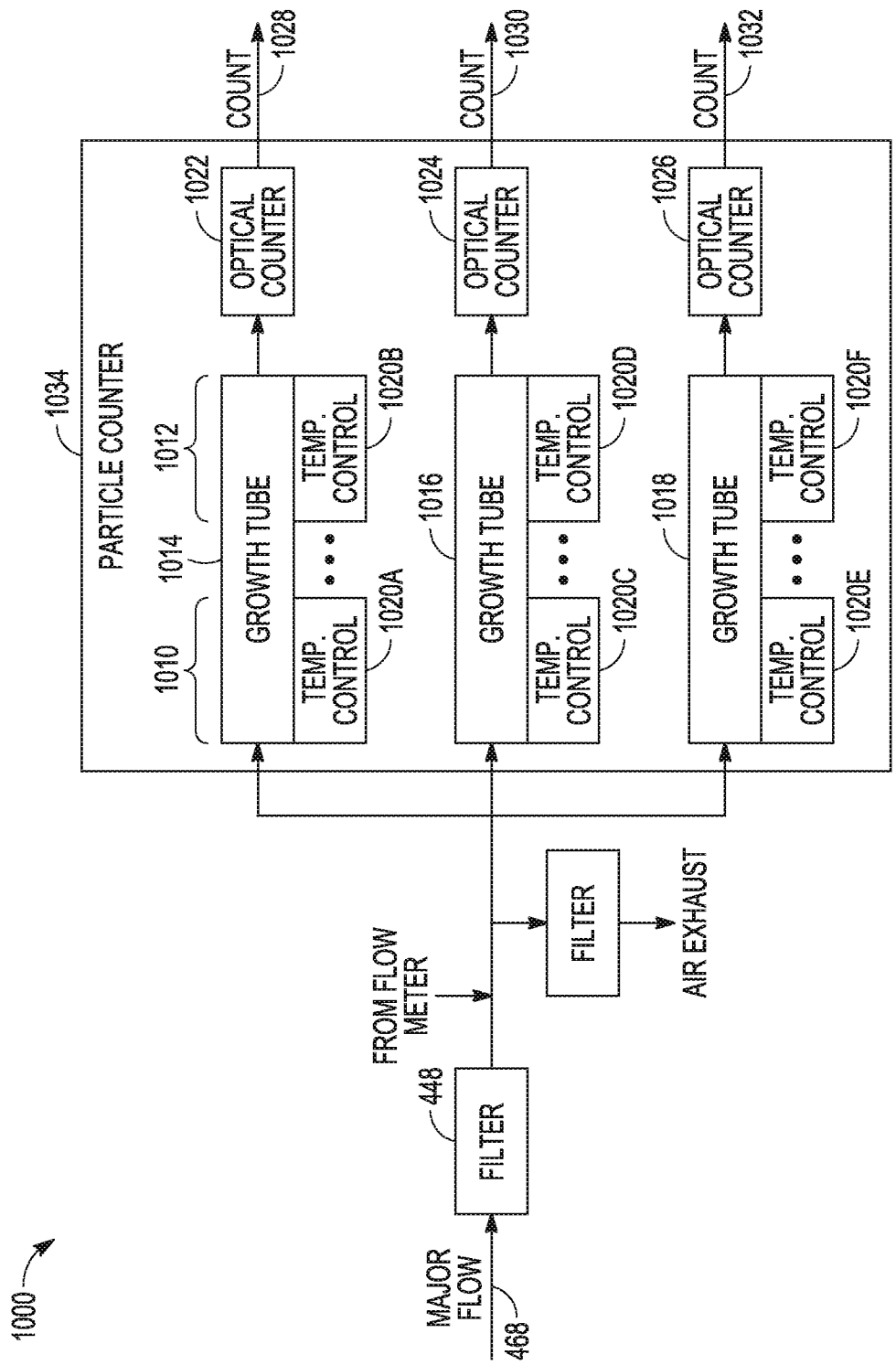

FIG. 10 illustrates a system for NVR count reduction, according to one example.

Figure 11:
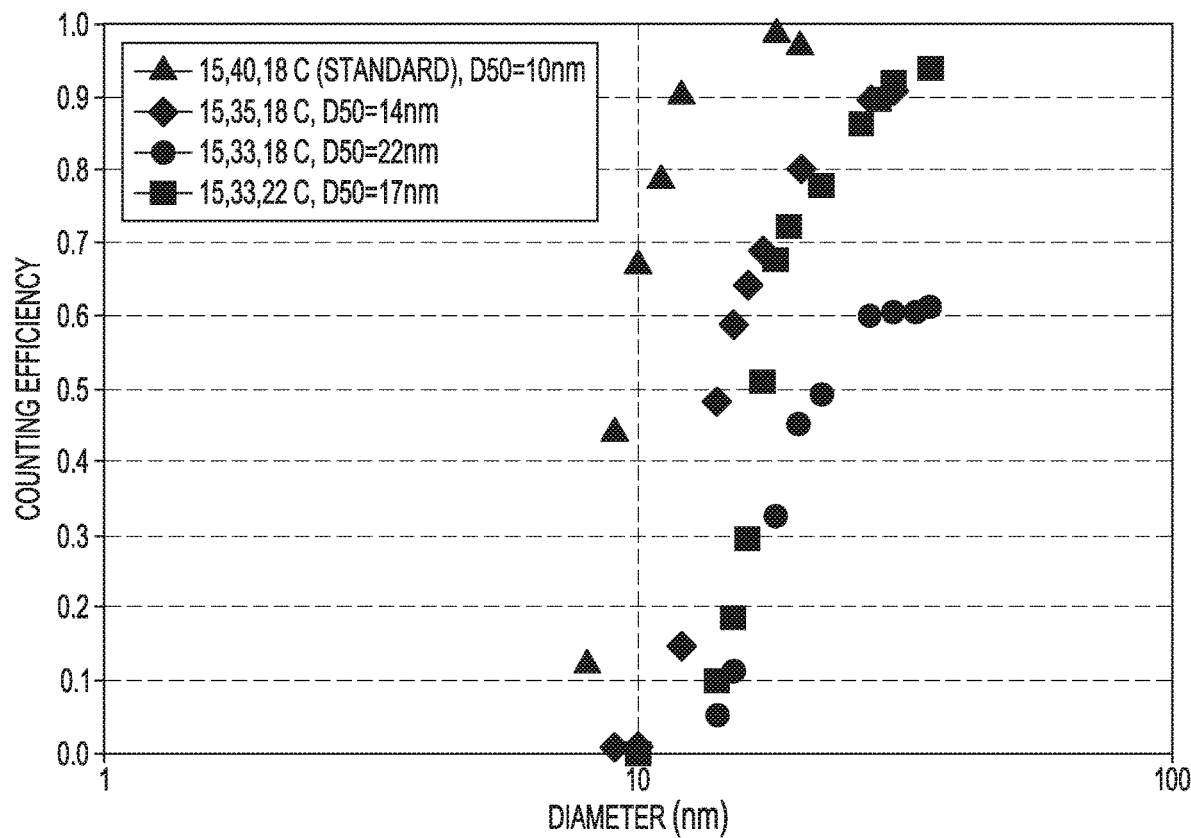

FIG. 11 illustrates CPC growth tube counting efficiency at various temperatures, according to one example.

Figure 12:
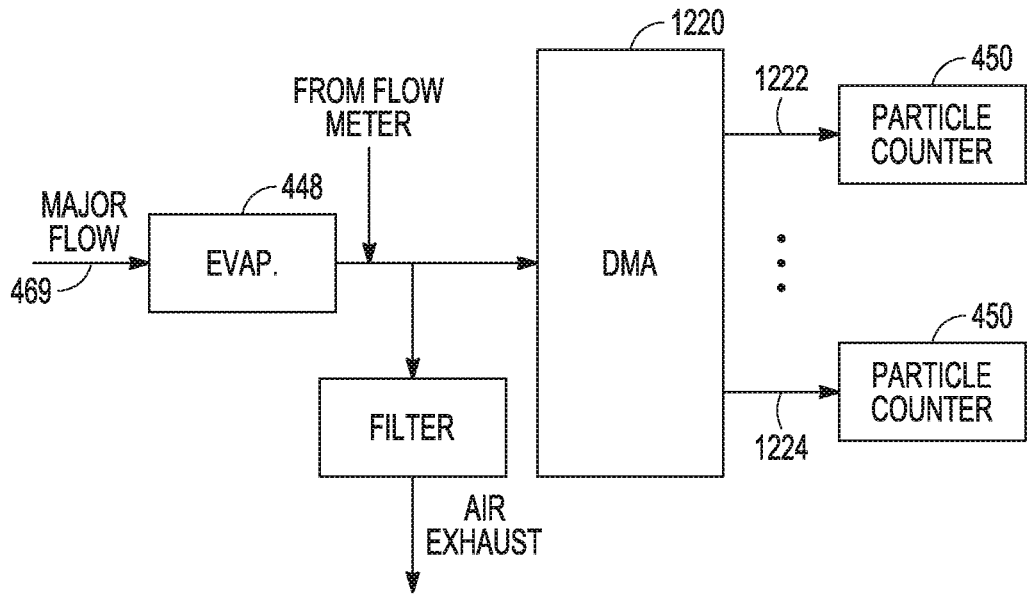

FIG. 12 illustrates diffusion screen penetration, according to one example.

Figure 13:
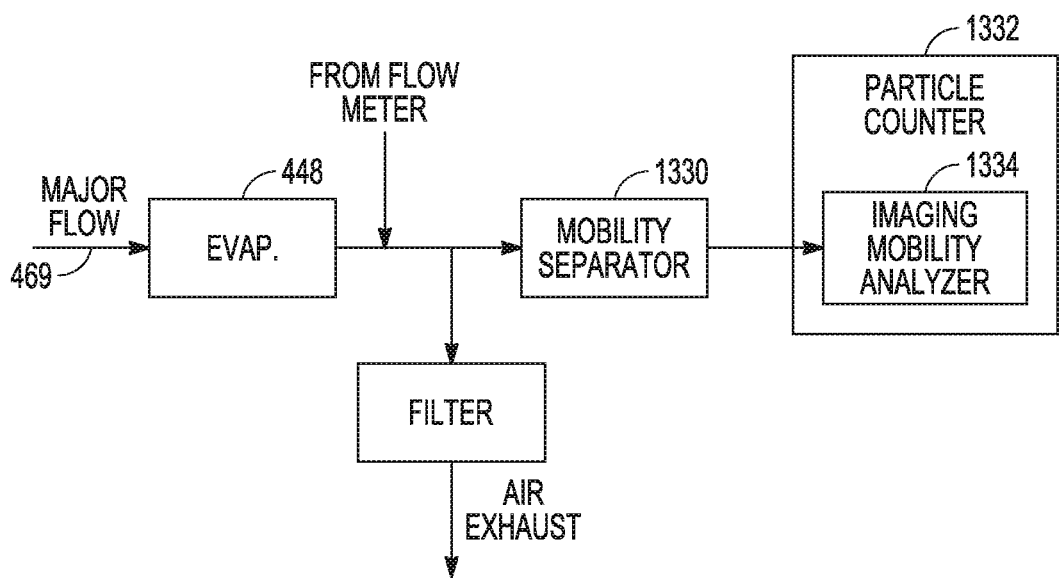

FIG. 13 illustrates, by way of example, a portion of a particle count system that includes diffusion screens between the heater and the particle counter.

Figure 14:
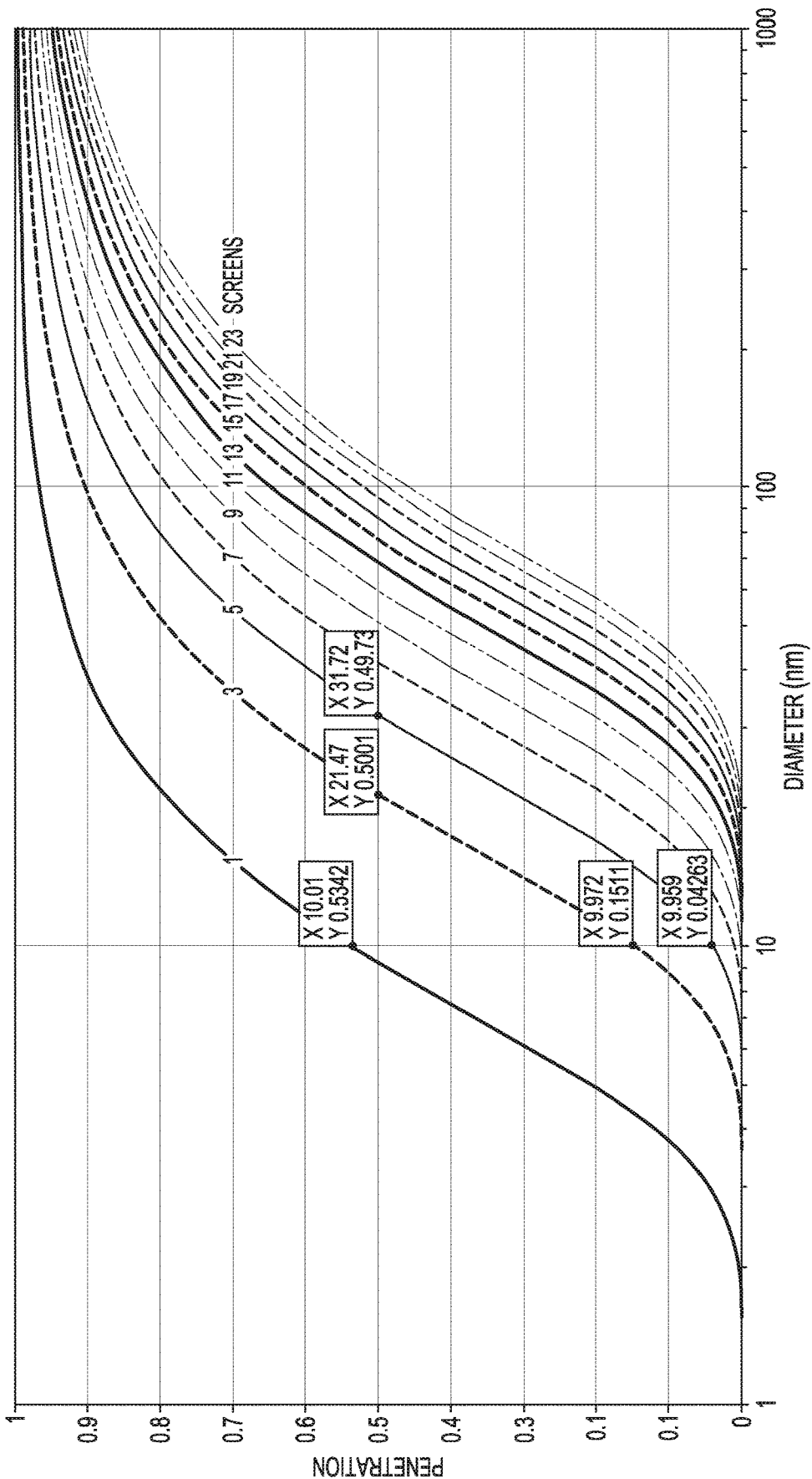

FIG. 14 illustrates ultra-pure water residue particle count, according to one example.

Figure 15:
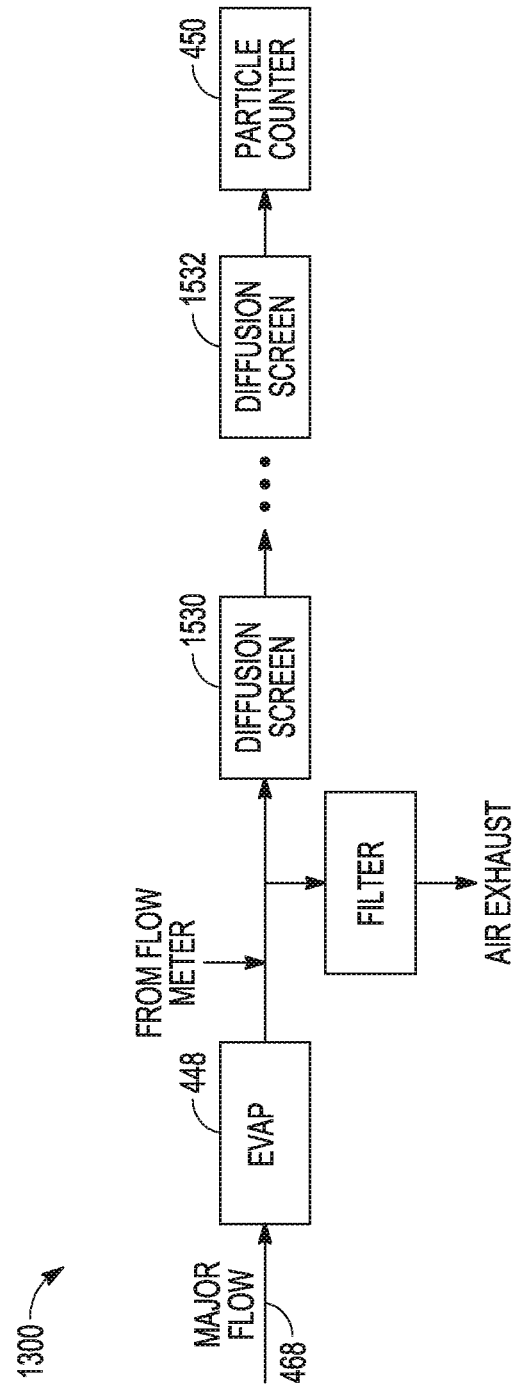
Figure 16:
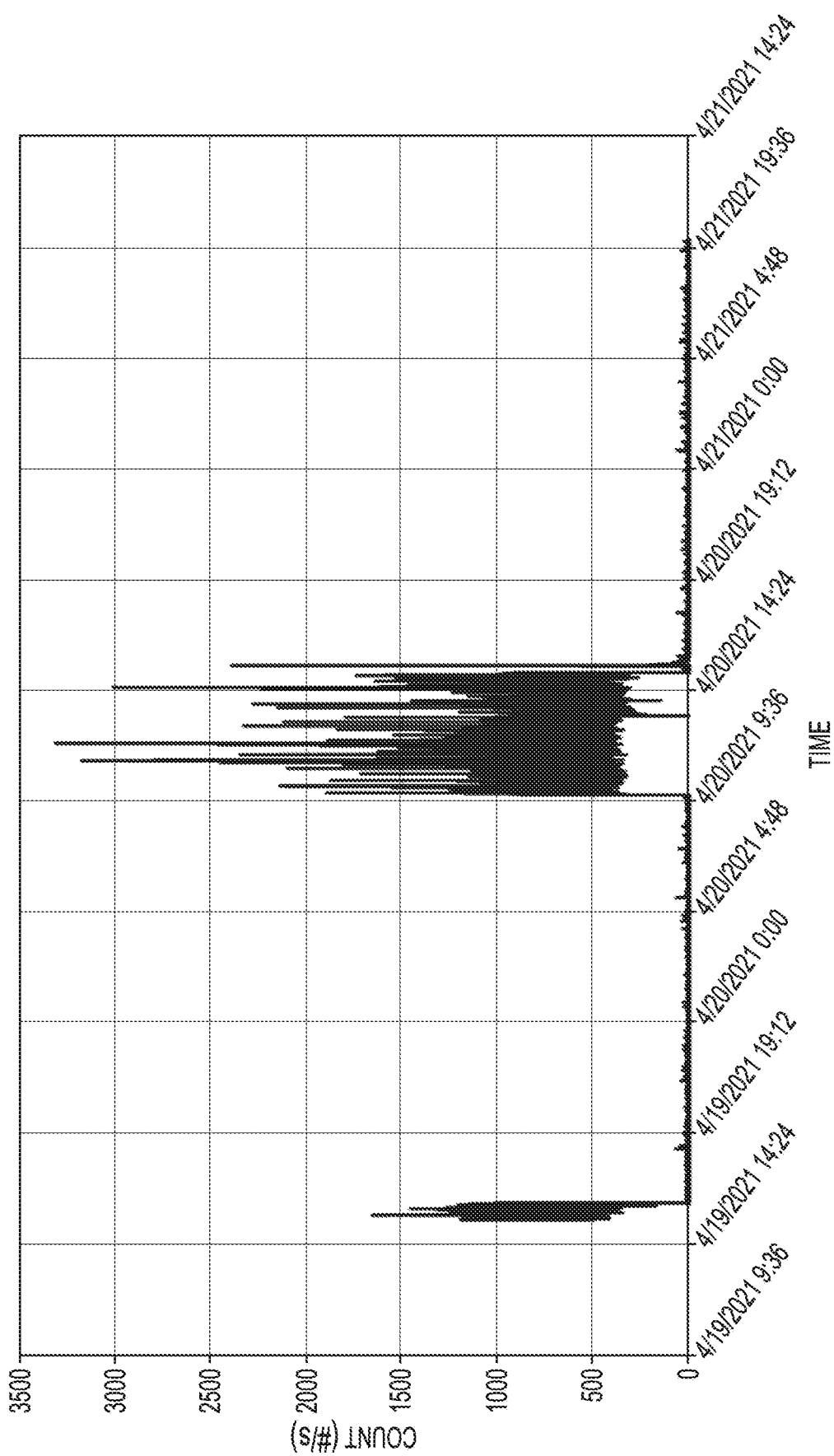

FIG. 15 illustrates, by way of example, a diagram of a liquid particle detection measurement technique, FIG. 16 illustrates ultrapure water residue particle count measured with and without a diffusion screen FIG. 17 illustrates a block diagram of a method for the aerosol-based liquid particle counting method.

DETAILED DESCRIPTION

One example of the present subject matter reduces the influence of NVR particles on the total particle count measured by the particle detector by separating solid particles from NVR particles. For solid particles (non-soluble particles), as long as the droplet sizes are reasonably small, the final particle sizes after evaporation are determined by the physical size/diameter of the solid particles. For NVR particles, the final particle sizes are determined by the particle precursor concentration in the liquid and initial liquid droplet size generated by the aerosolization process. That is, for certain particle precursor concentration, the NVR particle sizes solely depend on the initial liquid droplet size because the NVR particles are soluble. The smaller the initial droplet size the smaller the NVR particle size.

According to one example, an effective way to separate solid particles from NVR particles is to generate initial liquid droplets that will produce distinct NVR particle and solid particle size distributions after drying. FIG. 1 illustrates the effect of droplet sizes on solid and NVR particles using idealized lognormal distributions. In FIG. 1, dashed line 102 indicates NVR particle size from small droplets, solid line 104 indicates NVR particle size from large droplets, and dotted line 106 indicates NVR particle size for solid particles from large and small droplets. For NVR particles, the size distribution shifts to smaller sizes when initial droplet sizes decrease while for solid particles the distributions remain relatively unchanged as the final particles primarily depend on the physical sizes of the solid particles.

After the distributions of the solid and NVR particles are separated, the particle detector response function can be adjusted to minimize or reduce the particle counts from NVR particles. In one example, this includes adjusting the particle detector counting threshold so that the detector does not count NVR particles. For a given CPC, the response function is represented by its counting efficiency curve. A typical CPC counting efficiency curve with 9 nm cut point (50% count efficiency at 9 nm) is shown in FIG. 2.

The combined effect of CPC counting efficiency and solid and NVR particle size distributions are shown in FIG. 3, In FIG. 3, dashed line 332 represents a number of NVR particles counted, by the CPC, from small droplets, solid line 334 represents a number of NVR particles counted, by the CPC, from large droplets, and dotted line 336 represents a number of solid particles counted from large and small droplets. Since the CPC only counts a small fraction of NVR particles generated from small initial liquid droplets, the total CPC particle count is mainly contributed by solid particles resulting in better data correlation with the LPC data.

Atomizers produce relatively large liquid droplets, typically in the range of 0.5 to few micrometers in size. According to one example, an impactor or a virtual impactor, can be used to remove a majority of the large droplets after the atomization process. One example includes a virtual impactor.

FIG. 4 illustrates a block diagram of an embodiment of a system 400 for particle detection with aerosol atomization and large droplet removal. Elements of this example include a liquid supply unit 440, a gas supply unit 442, an atomizer 456, a virtual impactor 446, an evaporator 448, a CPC 450, and a waste liquid unit 452.

The liquid supply unit 440 receives liquid 454 and provides liquid 466 at a constant liquid flow rate to the atomizer 456 The purpose of the bypass liquid flow 455 is to allow higher liquid flow rate from the point of connection to the instrument liquid-in port so that liquid resident time inside the transport tubing can be minimized resulting in better instrument response time. The liquid 454 can include UPW or other ultra-pure liquids, such as isopropyl alcohol (IPA), hydrogen fluoride (HF) or hydrofluoric acid, standard clean one (SC1) solution, standard clean two (SC2) solution, or the like. The liquid supply unit 440 can include a filter 458, a shut-off valve 460, a regulator 462, and a pressure gauge 464. The filter 458 can remove large debris from the liquid 454. Large in this context can include particles greater than a specified size (e.g., 60 um or a greater or lesser specified size). In some examples, the filter 458 can be a stainless-steel filter. The valve 460 can be a gas-actuated shut-off valve. The valve 460 can control whether filtered liquid is provided to the regulator 462. The regulator 462 can be a liquid pressure regulator. The regulator 462 and the pressure gauge 464 can be set to control and monitor the liquid flow rate of the liquid 466.

The atomizer 456 aerosolizes the liquid 466 by breaking the liquid stream injected into the atomizer 456 with a supersonic jet of gas (from gas 472) through an orifice. Droplets resulting from the liquid stream breakup exit the orifice and then flow into a virtual impactor 446 chamber in which they are separated into small and large droplets according to the cut point of the virtual impactor 446. Small droplets are carried out by the major flow 468 while large droplets are carried out by the minor flow 470. In one example, a nanoparticie atomizer (NPA) is used to aerosolize the liquid and separate the droplets into the major flow 468 and the minor flow 470. The NPA combines the atomizer 456 and virtual impactor 446 into a small package. The atomizer 456 can generate small droplets, droplets that are less than 200 nm in diameter. The smaller the droplet, the less time it will take for the evaporator 448 to dry the droplet and if the droplet contains only dissolved content and no solid content, the small droplet will eventually evaporate and form a smaller size RAE particle for counting by the CPC 450.

The CPC 450 provides a humid environment in which the particles from the evaporator 448 (or evaporation space if no heater is used) serve as a seed to create droplets. The seed particles of sufficient size (e.g., greater than a condensation cut point of the CPC) grow to larger droplets and then these droplets reflect light and are counted by circuitry of the CPC 450. A CPC cut point, sometimes called "D50", is a function of temperatures in various locations of the CPC 450. The locations can include an initiator, conditioner, and moderator sections of a growth tube of the CPC 450. The D50 indicates a size at which about 50% of the seed particles grow to droplets detectable by the CPC 450. For example, a CPC 450 with a D50 of 10 nm will convert about 50% of the seed particles at 10 nm size to droplets and count the droplets. The other 50% of the seed particles remain at 10 nm and are undetectable by the CPC 450 counting circuitry because their sizes are below the counting threshold. The growth tube is the portion of the CPC 450 in which the particle becomes activated and grows to a larger size droplet if it is of sufficient size. The CPC 450 can use water (as opposed to alcohol) as a condensation fluid. In the aerosol field, the condensation fluid is commonly referred to as working fluid. A growth tube is a porous material that serves as a wick that is saturated with the working fluid and the temperature of the wick is regulated to create supersaturation for the environment within the wick, such as to "grow" a droplet out of a particle.

Figure 5A:
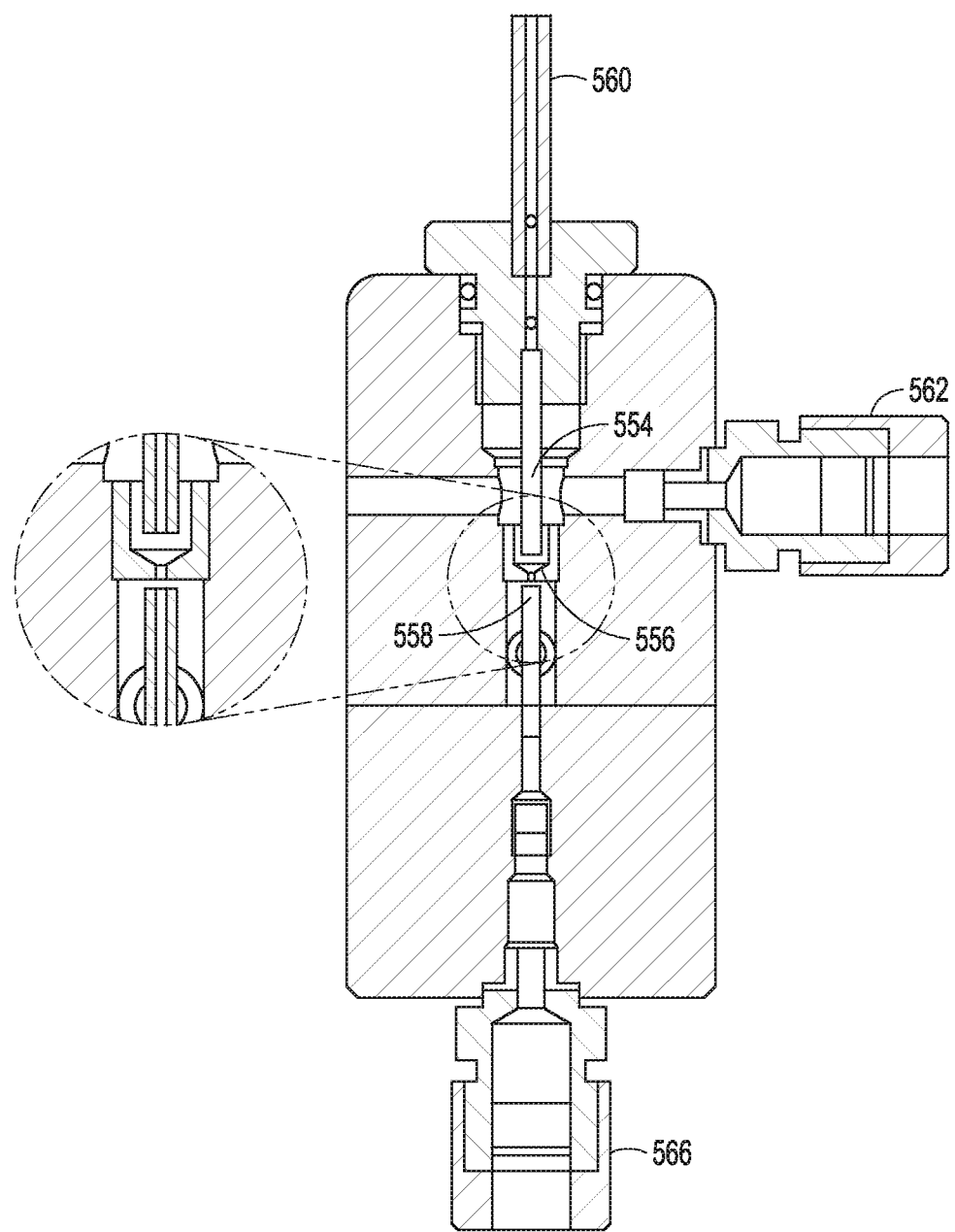
FIG. 5A illustrates a schematic diagram of a cross-section of a nanoparticle atomizer with a virtual impactor.
Figure 5B:
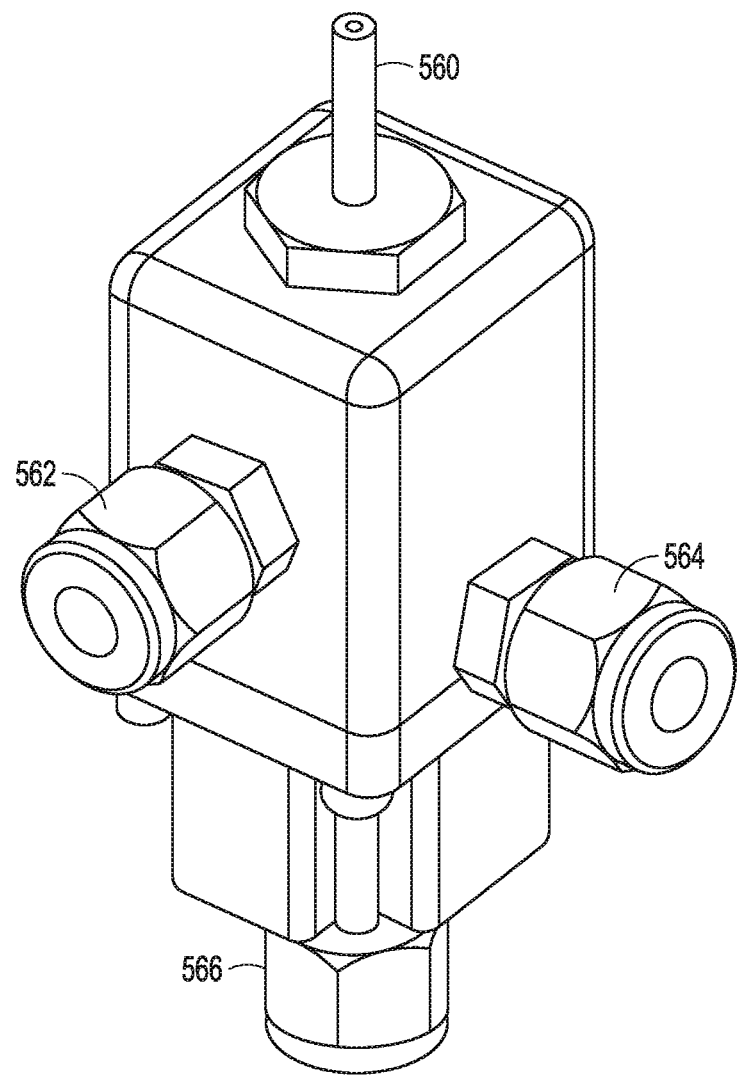
FIG. 5B illustrates a schematic diagram of a 3D model of the nanoparticle atomizer with a virtual impactor of FIG. 5A
Figure 5C:
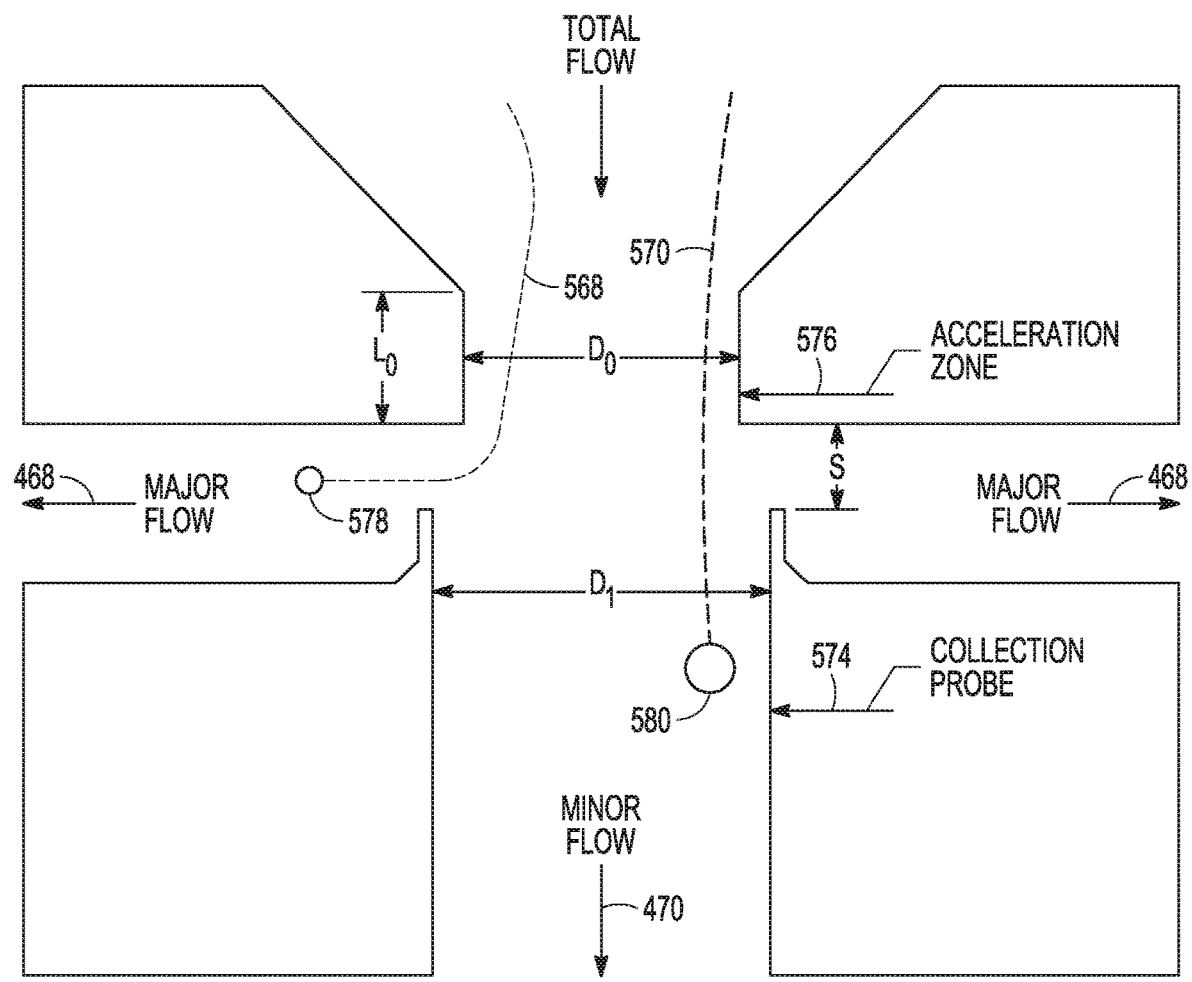
FIG. 5C illustrates respective gas and particle flow paths in a virtual impactor.
Figure 5D:
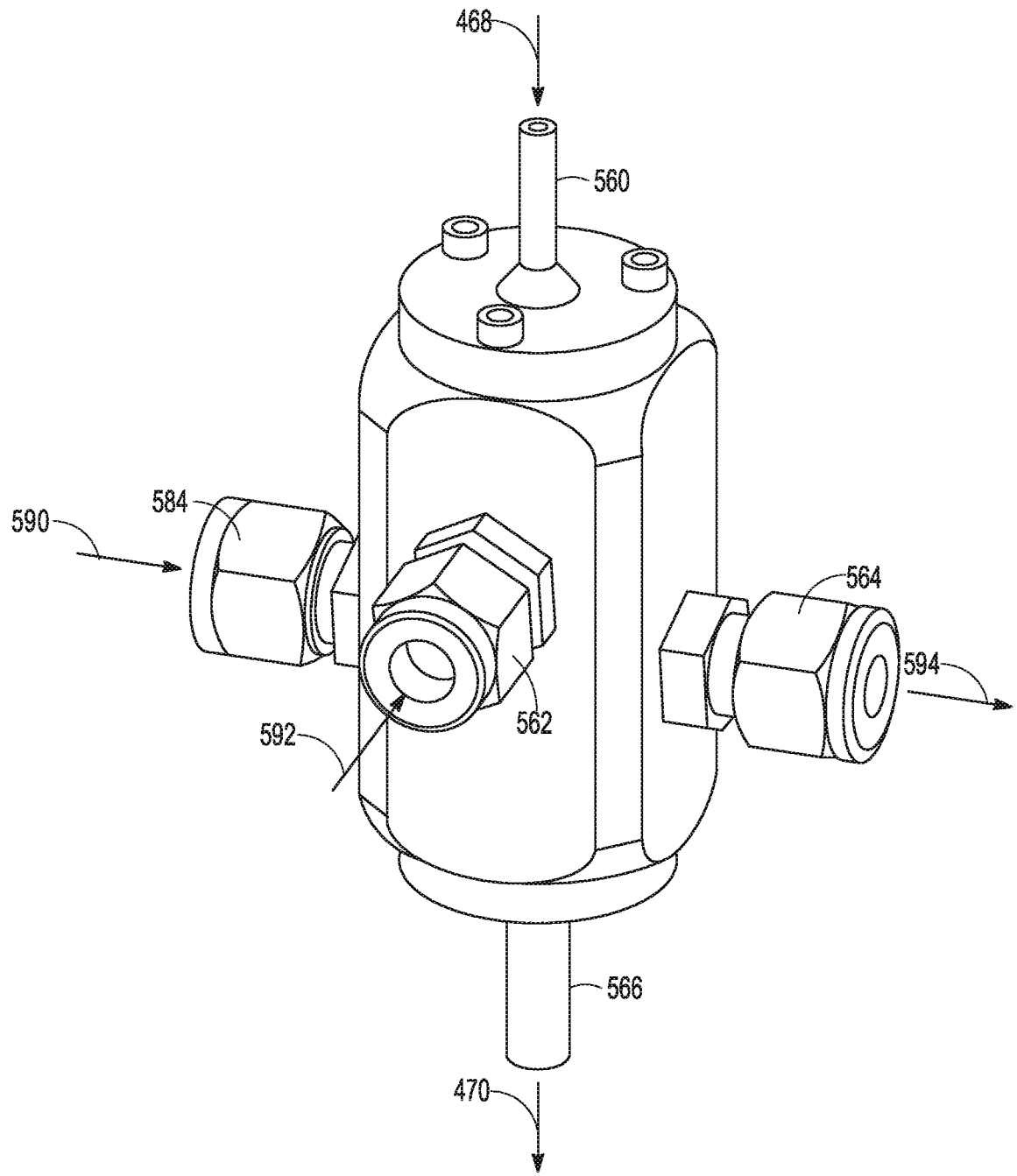
FIG. 5D illustrates, a schematic diagram of a 3D model of the nanoparticle atomizer with a virtual impactor of FIG. 5A.

FIGS. 5A and 5B illustrate a design that combines the atomizer 456 and virtual impactor 446 into a very small package. The atomizer section includes a liquid in port 560, a liquid capillary tube 554, a gas in port 562 and an orifice 556, while the virtual impactor section includes a major flow out port 564, a minor flow out port 566, and a receiving tube 558. The liquid in port 560 coupled to the liquid supply unit 440 and the gas in port 562 coupled to the gas supply unit 442. The major flow out port 564 coupled to the evaporator 448 and the minor flow port 566 coupled to the waste liquid unit 452. The liquid sample 466 is introduced into the unit via liquid in port 560. The liquid then flows through the liquid capillary tube 554 and then merges with the compressed gas from the gas in port 562. The liquid-gas combined flow passes through the orifice 556 and the liquid is aerosolized because of the supersonic jet of gas through the orifice. The droplets then flow into a virtual impactor chamber in which droplets are separated into small and large droplets according to the cut point of the virtual impactor. Small droplets are carried out by the major flow out port 564 while large droplets pass through the receiving tube 558 and exit the unit via minor flow port 566.

Figure 1:
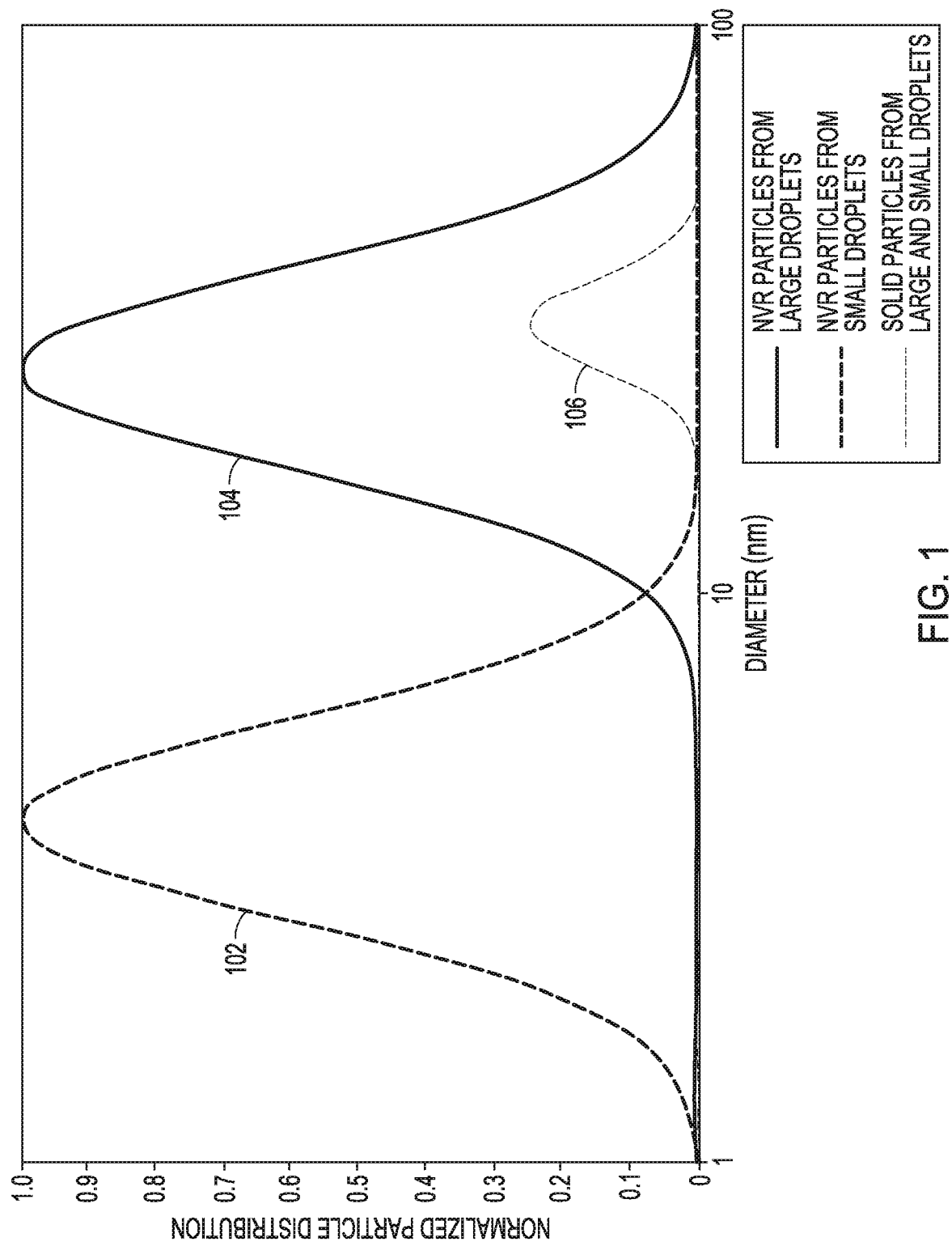
FIG. 1 illustrates a graph showing effects of initial droplet sizes on solid and NVR particle sizes.
Figure 2:
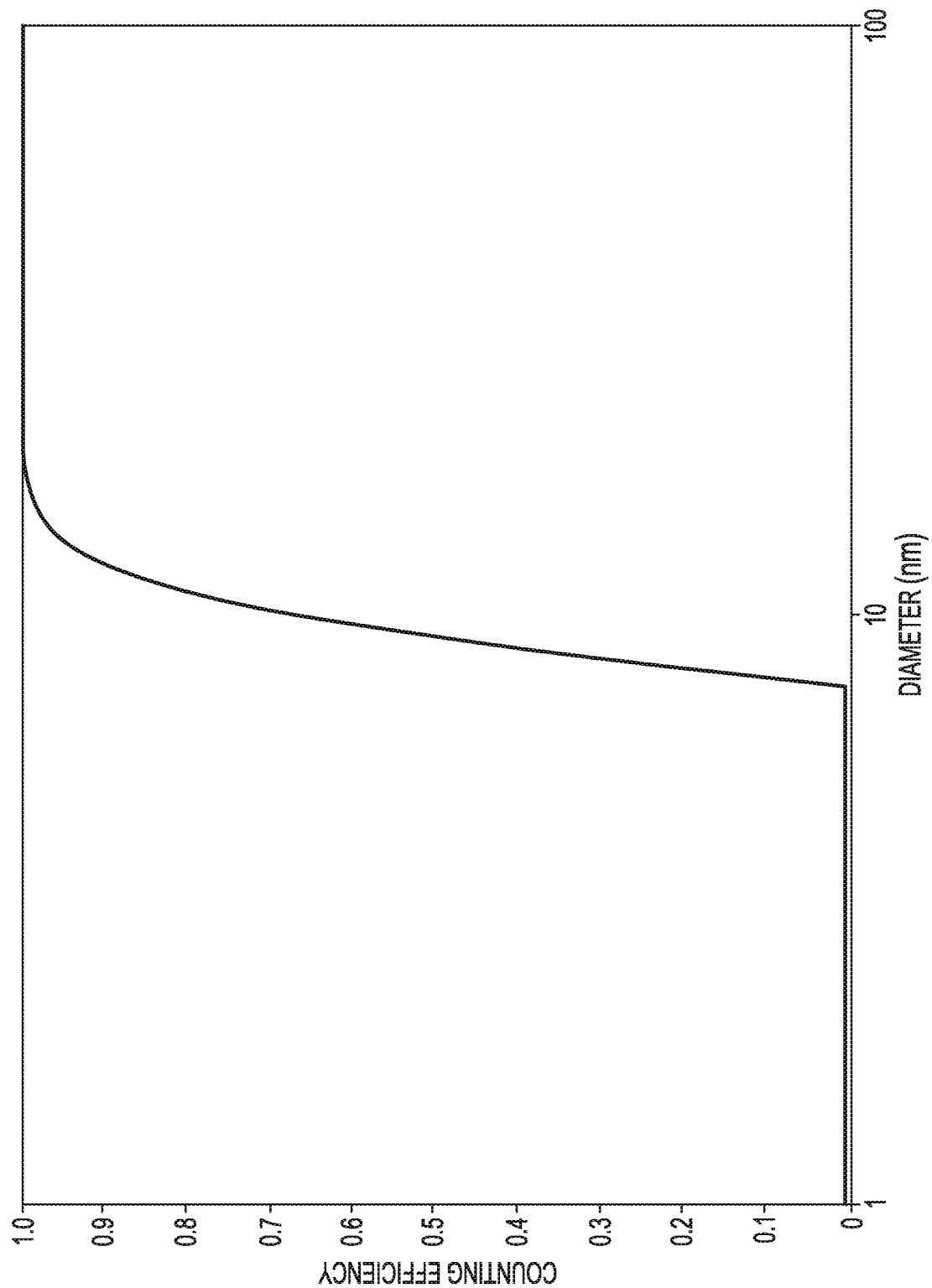
FIG. 2 illustrates a graph showing typical CPC counting efficiency.
Figure 3:
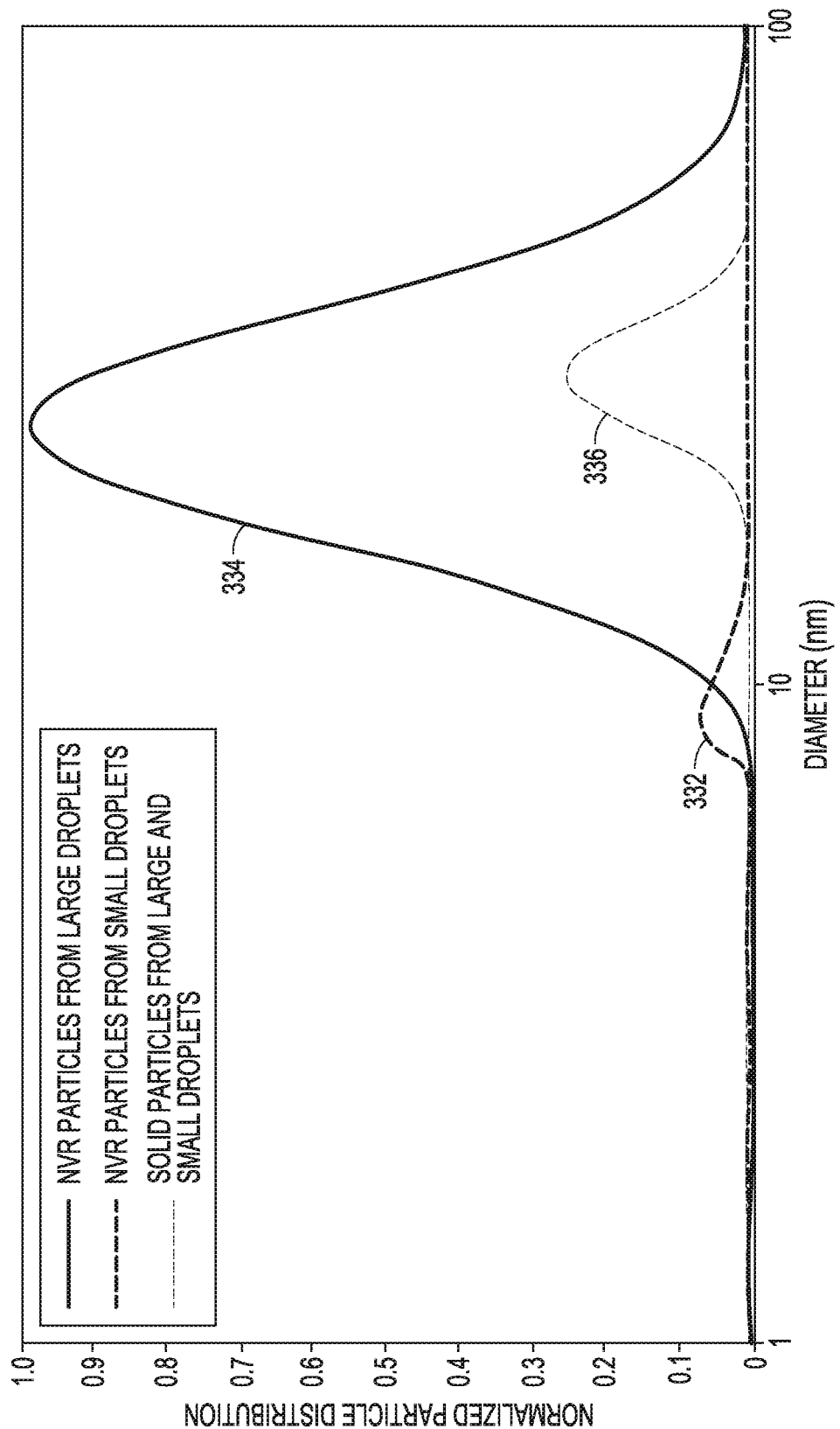
FIG. 3 illustrates a graph showing combined effect of solid and NVR particles distribution and CPC counting efficiency.
Figure 4:
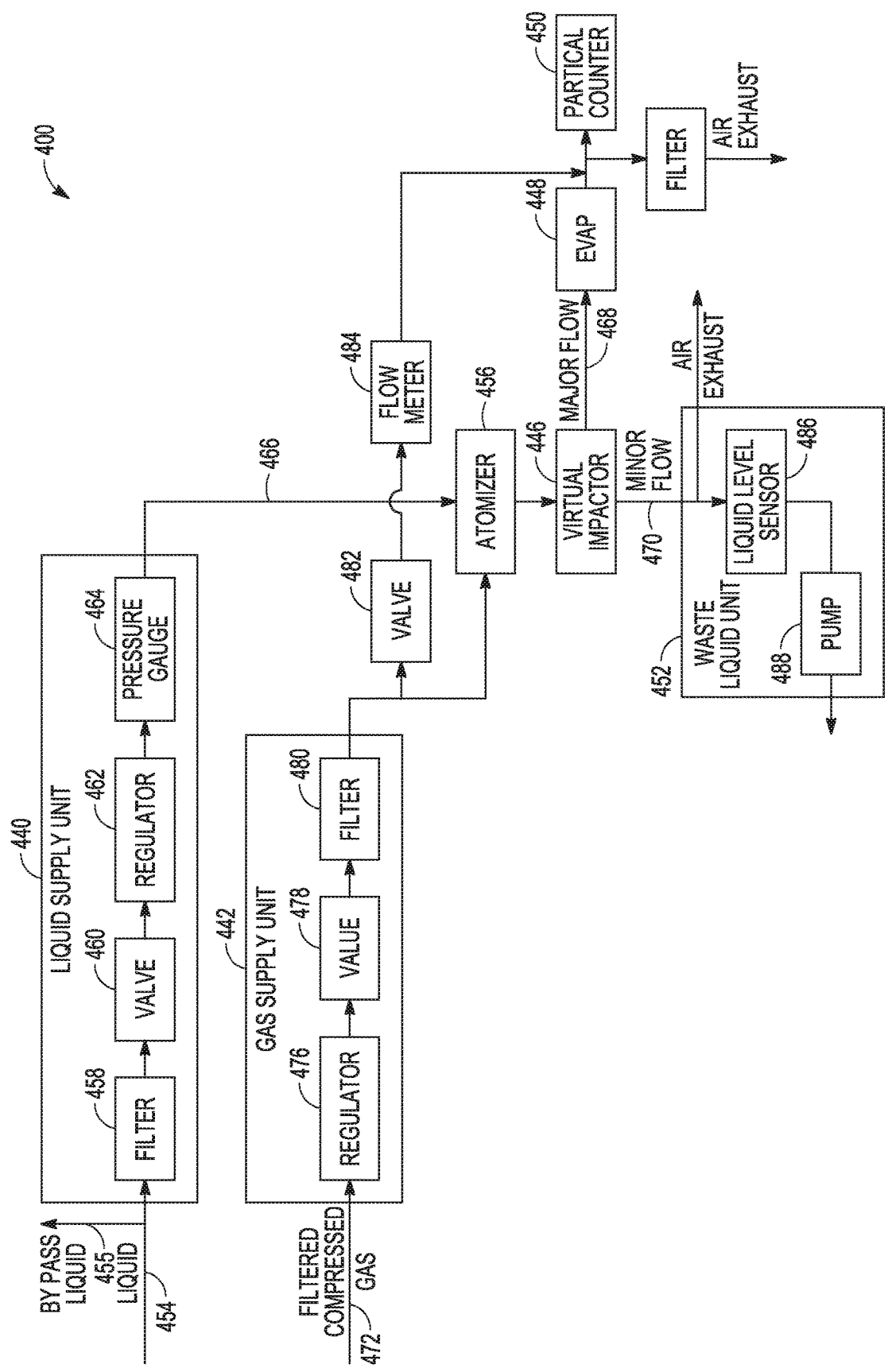
FIG. 4 illustrates an example of a liquid particle detection measurement system.

The evaporator 448 is coupled to the first output port 564, such as to receive droplets smaller than the virtual impactor size cut point. The waste liquid unit 452 (sometimes called a discharge reservoir) is coupled to the second output port 566, such as to receive droplets larger than the size cut point. The CPC 450 can be coupled to the first output port 564 at a location downstream of the evaporator 448 (to receive particles that have been dried by the evaporator 448). The evaporator 448 can include a region of conduit (e.g., with air or other gas flow) that provides droplets with time to dry, a heater that increases a temperature of air within the conduit, a combination thereof, or the like. The evaporator 448 can be internal to external to the atomizer 456. A heater can help speed up the evaporation process but is optional.

The virtual impactor 446 is distinct from a real impactor. In a real impactor, a gas stream that includes a corner in its path is created. Particles are injected into the gas stream. Particles with sufficient momentum (by having larger size) are unable to negotiate the corner and impact on a surface that forms the corner. In a virtual impactor 446, a gas stream is created that includes a corner in its path. However, in a virtual impactor, particles with sufficient momentum that are unable to make the corner do not impact the surface that forms the corner. Instead, those particles that do not navigate the corner traverse to the second output port 566 of the virtual impactor. Such a configuration allows the larger droplets to be collected at the waste liquid unit 452 (rather than collecting on a wall or surface of the impactor) and be used for determining liquid flow rate, particle count per volume, or the like. These calculations are not reliable when using a real impactor. Also, the virtual impactor 446 does not interrupt the minor flow that contains the droplets as happens in a real impactor. This allows more liquid to be analyzed through the major flow per unit time when using a virtual impactor as compared to a real impactor. Further, a different set of design parameters for the virtual impactor provides the ability to collect the larger droplets through the minor flow (rather than having to mitigate a volume of liquid at the real impactor collection point, an internal sidewall) allowing for measurement of total liquid flow. Further, liquid collected on the impaction surface in a real impactor can be re-atomized by gas flowing over the surface, typically resulting in generation of large droplets, and thereby large NVR particles. The liquid collected in the receiving tube in the virtual impactor is expelled with the minor flow, preventing re-atomization and generation of large NVR particles.

FIG. 5C includes a schematic diagram illustrating operation of the virtual impactor 446. The virtual impactor 446 is a device used to separate particles by size into two gas streams (indicated by dashed line 570 and dotted line 568). The impaction surface of the virtual impactor 446 is a virtual space of stagnant or slow-moving gas (minor flow 470). Large particles are captured in a collection probe/receiving tube 574 rather than impacted onto a surface. The aerosol passes through an acceleration nozzle or orifice 576 and is directed toward the collection probe 574. At this point, a major portion of the flow (see "major flow") is diverted 90° away from the collection probe 574. This diversion of the flow is what causes the particle-size separation. Small particles 578 with low inertia follow the flow streamlines indicated by dotted line 568 and are carried with the major flow. Large particles (or droplets) 580 with greater inertia deviate from the flowlines and continue moving along the flowlines indicated by the dashed line 570 in the forward path to the collection probe 574 and with the minor flow. The separation efficiency curve is determined by the ratio of the major and minor flows and the physical dimensions of the nozzle 576 and collection probe 574.

FIG. 5D illustrates an alternative nanoparticle atomizer. In the nanoparticle atomizer of FIG. 5D, a filtered and dry makeup flow 590 is provided through a port 584. The makeup flow 590 is merged with the major flow 468 at a base of a receiving tube 560. An advantage of merging the makeup flow 590 and the major flow 468 includes a majority of droplets in the major flow 468 are rapidly dried by the makeup flow 590 to much smaller size RAE particles, resulting in less particle losses. The reduction in particle losses is due, at least in part, to the reduced probability of particle conglomeration. Also, the evaporator 448 and a quench flow may no longer be needed as the droplets are already dried by the makeup flow 590, The elimination of the evaporator 448 reduces the number of hardware components, instrument footprint, instrument cost, and provides better instrument response time.

A combination of a portion of the makeup flow 590 and a portion of the major flow 468 (indicated by arrow 594) is provided at the port 564. The flow indicated by arrow 594 can be provided directly to the particle counter 450 (without the evaporator 448, see FIG. 4). The port 562 received compressed air 592 (e.g., from gas supply unit 442) that helps merge the makeup flow 590 and the major flow 468.

The cut point of the virtual impactor 446 influences the ability to generate small droplets which then produce small NVR particles after evaporation. The smaller the virtual impactor 446 cut point, the smaller the NVR particles generated resulting in better separation between NVR and solid particles.

The small droplets carried out by the major flow can be dried by an evaporator 448 before entering the particle detector (e.g., CPC 450) for particle count measurement. To facilitate the drying process of small droplets, the evaporator 448 at an elevated temperature can be used. The flow exits the evaporator 448 and is merged with gas flow from the gas supply unit 442, such as to reduce chances that water vapors re-condense on the dried particles or plumbing surfaces, potentially resulting in re-atomization. The filtered gas for the atomizer 456 and the flow from the evaporator 448 can be provided by the gas supply unit 442. The gas supply unit 442 can include a gas pressure regulator 476, a shut-off valve 478, and a filter 480. A valve 482 can control gas flow from the gas supply unit 442 to the output of the evaporator 448. A flow meter 484 can monitor the gas flow from the valve 482. To provide an accurate particle count measurement, the CPC 450 can be used as the particle detector.

Large droplets carried out by the minor flow 470 enter a waste liquid unit 452 which, in one example, includes a liquid level sensor 486 in a liquid trap container and a liquid pump 488. The function of the waste liquid unit 452 is to separate liquid droplets from the gas stream. After liquid droplets are separated from the flow, the gas stream then flows upward and exits the container from the top. The liquid collected in the liquid trap container will accumulate over time and the collected liquid can be removed from the container by activating the pump 488 before it overfills and floods the instrument.

The liquid level sensor 486 can be used to monitor the level of the liquid in the waste liquid unit 452. According to one example, the liquid level sensor 486 can include a capacitive sensor. The liquid level sensor 486 measures the liquid level. The liquid level can then be calibrated to provide liquid volume and liquid flow rate for the system 400. After the liquid level reaches a specified threshold value, the liquid pump 488 can be triggered to remove the liquid from the unit 452. The liquid level sensor 486 can be used to estimate the amount of liquid injected into the atomizer 456. The liquid level sensor 486 can measure the liquid flow rate and reduce or eliminate the risk of contaminating the liquid. The relationship between the atomizer 456 sample flow and the total liquid volume carried out by the minor flow 470 can be determined by injecting a known volume of liquid into the atomizer 456 (for example, via a syringe pump) and measuring the total liquid volume collected in the waste liquid unit 452. The liquid-to-aerosol conversion rate (droplets carried out by the major flow 468) can then be determined from these two liquid flow rates. Note that some liquid losses may occur in the measurement system, and these losses can be considered to improve measurement accuracy.

Capacitive Sensor

One example of the present subject matter includes a liquid level sensor 486 that operates based on capacitive level-sensing. A capacitive sensor uses a change in capacitance between two electrodes to measure the change in liquid level. The change in liquid level can be calibrated to provide liquid volume and flow rate. One of the advantages of this measurement method is that it has a simple mechanical construction and no moving parts leading to wear and tear. An example of a capacitive sensor has two parallel plate electrodes as illustrated in FIG. 6.

Capacitance C can be determined as follows:

$$C = \frac{Q}{V} = \varepsilon_0 \varepsilon_r \frac{A}{d}$$

where, Q is the charge on the capacitor, V is voltage, $\varepsilon_0$ is the permittivity of vacuum, $\varepsilon_r$ is the relative permittivity (dielectric constant), A is the surface area of the electrodes, and d is the gap between the two electrodes. As the liquid level changes, the amount of dielectric material between the two electrodes changes resulting in change in capacitance. The higher the dielectric constant of the medium between the electrodes, the higher the amount of charge can be stored in the capacitor. Since the dielectric constant of the liquid is typically much higher than the dielectric constant of gas, the capacitance can be approximated by the submerged section of the electrodes. The variations in capacitance can be measured by varying the voltage applied to the electrodes.

As shown in FIGS. 6A, 6B, 6C, 6D, and 6E variations in capacitive sensor 660A, 660B, 600C, 600D, and 600E configuration are contemplated. In addition to a parallel plate configuration illustrated in FIGS. 6A-6D, the electrodes can also be configured as a concentric tube construction which has the advantage of reduced interference, wider capacitance range as well as better mechanical stiffness and robustness. Such a concentric tube construction is illustrated in FIG. 6E. Calibration is typically performed to get an accurate capacitance signal corresponding to the liquid level.

A variety of capacitive sensors 600A, 600B, 600C, 600D, and 600E are illustrated in FIGS. 6A-6E, respectively. The capacitive sensor 600A includes a container 666 to receive liquid from the minor flow 470. Electrodes 660, 662 in the form of parallel plates are situated internal to the container 666. The electrodes 660, 662 are illustrated as including an air gap between the electrodes 660, 662 and an inside surface of the container 666.

The capacitive sensor 600B of FIG. 6B is similar to the capacitive sensor 600A with the electrodes 660, 662 mounted on an outside surface of the container 666. The dielectric properties of the container 666 affect the capacitance calculation in the embodiment of FIG. 6B. The capacitive sensor 600C of FIG. 6C is similar to the capacitive sensor 600B with the electrodes 660, 662 mounted with an air gap 674 between an outside surface of the container 666 and the electrodes 660, 662. The dielectric properties of the container 666 and air gap affect the capacitance calculation in the embodiment of FIG. 6C.

The capacitive sensor 600D of FIG. 6D is similar to the capacitive sensor 600C with additional parallel plate electrodes 668, 670, spaced apart from the electrodes 660, 662. The electrodes 668 and 670 are mounted outside of an outside surface of the container 666 with the air gap 674 between the electrodes 668 and 670 between the electrodes 668 and 670 and the container 666. The dielectric properties of the container 666, the air gap 674, and the additional electrodes 668, 670 affect the capacitance calculation in the embodiment of FIG. 6D. FIG. 6E illustrates a capacitive sensor 600E with concentric electrodes 672. The concentric electrodes 672 are illustrated as internal to the container 666.

As a level of liquid 664 increases and displaces air in the container 666, the capacitance between the electrodes 660, 662, 668, 670 changes. This change in capacitance is directly proportional to a volume of the liquid 664 in the container 666. The change in liquid volume over time helps determine a flow rate, total liquid volume, or other property of a particle detection and counting system.

The disclosed subject matter can be evaluated with UPW. The particle count per second measured by the CPC is shown in FIG. 8. To provide a quantitative measurement of cleanliness of the UPW, the particle count measured by the CPC can be in units of the number of particles per mL of liquid. In this case, the liquid is the UPW. Since only a small fraction of the liquid injected into the atomizer gets turned into aerosols, the liquid-to-aerosol conversion rate is considered. In addition, the aerosol flow is diluted by the quenching flow, so the dilution ratio is also applied to the data. After corrections, the average particle concentration in the liquid is determined to be about 180,000 particles counted/(mL, of liquid) for the CPC's aerosolized particle count data shown in FIG. 7.

The liquid level capacitive sensor 600 can also be evaluated with UPW. An example of the capacitance vs liquid volume response curve is shown in FIG. 8, Since the electrodes 660, 662, 668, 670, 672 do not extend all the way down to the bottom of the container 666, there is a region where the capacitance remains unchanged while liquid volume increases. As the liquid 664 reaches the bottom part of the electrodes 660, 662, 668, 670, 672, the capacitance increases almost linearly with the liquid level or volume. There may be some deviations from a linear line when the liquid level is close to the bottom of the electrodes 660, 662, 668, 670, 672 and when the capacitive sensor is almost saturated (when the liquid 664 is near the top of the electrodes 660, 662, 668, 670, 672). This may be related to non-uniform electric fields about the electrodes 660, 662, 668, 670, 672 and artifacts from a data acquisition board.

The capacitive sensor 600 has sensitivity to allow detection of change in capacitance caused by each waste-liquid droplet. As illustrated in FIG. 9, every droplet dropped into the container 666 generated a change in the capacitance. This change can then be used to determine the volume of the droplet. The time-between-droplets can also be measured by subtracting the difference between the step changes in the x-direction (elapsed time). The droplet volume and time-between-droplets provide another means to estimate the liquid volume accumulated in the container and liquid flow rate. These estimations can be cross-referenced to the values determined from the capacitance—liquid volume calibration curve (such as the curve shown in FIG. 8) to provide a more robust and accurate volume or capacitance measurement.

To help evaluate correlation of the data from an example of the present subject matter with that from an LPC instrument in situations in which a sufficient number of solid particles are in the particle count, one example of the present subject matter includes removing, excluding, or reducing the number of NVR particles from the CPC count. According to one example, one approach to further reduce or exclude the NVR particles includes shifting the CPC cut point to a larger size. Using NVR particles 332 and solid particles 336 in FIG. 3 as an example, shifting the CPC cut point to larger size will reduce the amount of NVR particles 332 contributed to the CPC total particle count, while it has minimum effect on the solid particles 336, as long as the CPC cut point is not too large. That is, the reduction of the CPC total particle count can be partly from elimination of undesirable NVR particles and this will result in better data correlation with the LPC instrument in the instance described and separate NVR count from solid particle contribution, such as to provide a better quantitative understanding of solid and NVR particle contribution. The adjustment of the CPC cut point is commonly done by varying the temperature settings of the CPC such as using different temperature configurations for a conditioner, initiator, and moderator portions of a growth tube. Monodisperse test particles such as sucrose, sodium chloride, silver particles are typically used for this kind of CPC calibration. RAE particles can also be used.

Since size-dependent particle counts may provide useful information about the composition, origin, distribution, or other parameters of aerosols of interest, one may be able to obtain this size-dependent particle count information by measuring the same particle sample with various CPC cut points. This can be done with using multiple standalone CPC units with various cut point. Disadvantages of using this multiple CPC approach are higher instrument cost and larger overall instrument footprint.

Another commonly used method is to use one CPC but varying the CPC cut points sequentially. The drawbacks of this method are longer measurement time and slower instrument response time as the measurements are done sequentially. Such a solution is sometimes called a scanning threshold particle counter. A scanning threshold particle counter (described in U.S. Pat. No. 10,697,879) is unsuitably slow since the particle distribution is obtained only after each set point is reached using a single CPC. In contrast, using multiple growth tubes in a single CPC unit or multiple independent CPCs allows the instantaneous measurement of a size distribution as described herein. Further, the scanning threshold particle counter does not include a virtual impactor, it includes a real impactor, and it does not use water as its working fluid.

One improved technique proposed here is to use a multi-headed CPC design which includes multiple growth tubes and optical detection systems in which the growth tubes can include different temperature-controlled regions. An example of a multi-growth tube, multi-optical detection system CPC is disclosed in the U.S. Pat. No. 10,578,539.

FIG. 10 illustrates a portion of a system 1000 for NVR count reduction, according to one example. The system 1000 as illustrated includes a particle counter 1034 with multiple growth tubes 1014, 1016, 1018 coupled to respective optical counters 1022, 1024, 1026. Each of the growth tubes 1014, 1016, 1018 includes individual temperature controls 1020A, 1020B, 1020C, 1020D, 1020E, 1020F. Each of the temperature controls 1020A-1020F individually controls a temperature in a portion of one of the growth tubes 1014, 1016, 1018. Each of the temperature control 1020A-1020F operating parameters can be independently controlled to obtain different D50s. The system 1000 improves upon prior systems by including independent temperature controls 1020A-1020F for growth tubes 1014, 1016, 1018. The temperature controls 1020A-1020F can include an electrical, fluid, magnetic, or gas-based temperature control means.

The flow from the meter 484 (see FIG. 4) and particles left after heating (using the evaporator 448) droplets of the major flow 468 are provided to a flow divider that provides a first portion of the particles to the growth tube 1014, a second portion of the particles to the growth tube 1016, and a third portion of the particles to the growth tube 1018. A region 1010 of the growth tube 1014 is heated or cooled using the temperature control 1020A and another different region 1012 of the growth tube 1014 is heated or cooled using the temperature control 1020B. While two temperature controls per growth tube 1014, 1016, 1018 are illustrated, more than two temperature controls 1020A-1020F can retain different portions of the growth tube 1014, 1016, 1018 at or about different temperatures.

Each of the growth tubes 1014, 1016, 1018 can provide droplets to respective optical counters 1022, 1024, 1026. Each of the optical counters 1022, 1024, 1026 can determine, using optical means, how many droplets (and ultimately particles), are provided through the growth tube 1014, 1016, 1018, respectively. The number of counted droplets is provided as a respective count 1028, 1030, 1032 from the optical counter 1022, 1024, 1026, respectively.

As the growth tubes 1014, 1016, 1018 can be configured with different D50s by the temperature controls 1020A-1020F they can be configured to count particles with different size ranges, simultaneously. Comparing to the multiple CPC approach, the system 1000 has the benefit of smaller footprint as all the components can be housed in the same chassis and many of the electronics can be consolidated into fewer components. The performance of this multi-headed system 1000 is also superior to the single CPC multiple D50 approach in term of measurement time and instrument response function as all the size-dependent measurements are done in parallel. That is, using a plurality of growth tubes 1014, 1016, 1018 configured to provide different D50 cut points through temperature control 1020A-1020F, enables instantaneous measurement of a size-dependent particle count measurement. This size-dependent particle count information may be useful to further differentiate solid particles from NVR particles. This can also result in better correlation to the LPC instrument. The counting efficiencies of a CPC with various cut points (D50s) are shown in the FIG. 11. The three temperatures shown in the legend of the graph are the conditioner, initiator, and moderator temperatures, respectively. The conditioner, initiator, and moderator are different portions of the CPC growth tubes 1014, 1016, 1018. For this particular particle counter, the D50 increases with decreasing initiator temperature. When the initiator temperature is at 35° C., the D50 is about 14 nm. With initiator temperature at 33° C. and moderator temperature at 22° C., the D50 moves to 17 nm. The D50 of this CPC can be extended to larger sizes if the growth tube is modified to longer length.

Consider the problem of detecting particles that are between 10 nm and 30 nm in size. A growth tube or CPC with a D50 at about 10 nm can be used in conjunction with a growth tube or CPC with a D50 at about 30 nm. The difference in count between the 10 nm and 30 nm can indicate the number of particles between 10 nm and 30 nm.

Another improved technique proposed here is to use a differential mobility analyzer (DMA) that provides multiple outputs. Each output from the DMA can provide particles of a different size range (different mobility) to a respective particle counter 450.

FIG. 12 illustrates, by way of example, a block diagram of an embodiment of a portion of a system 1200 for concurrent counting of particles with different size distributions. The system 1200 is similar to the system 400, with the system 1200 including a DMA 1220 and multiple particle counters 450 coupled downstream of the evaporator 448.

The DMA 1220 includes two concentric electrodes and a flow path between the electrodes in which particles move. When a voltage is applied across the electrodes, particles are diverted from the straight path in the resulting electrical field and organized based on their electrical mobility. When the voltage is constant the DMA generates monodisperse aerosols from a polydisperse particle source. When the voltage is varied the output is a size classified aerosol that, when counted with the particle counters 450, gives the particle size distribution. The DMA 1220 provides multiple outputs 1222, 1224 that carry particles of different sizes. Thus, one particle counter 450 counts particles provided on output 1222, and another particle counter 450 counts particles provided on another output 1224. Since the counting occurs in parallel, the system 1200 operates faster than the scanning threshold particle counter.

Yet another improved technique proposed here is to use a mobility separator and an imaging device, such as a charge coupled device (CCD) to perform particle counting. This technique is similar to the system 1200 with some modifications. A mobility separator and imaging device are described in U.S. Pat. No. 9,395,281.

FIG. 13 illustrates, by way of example, a diagram of an embodiment of a portion of a particle distribution counting system 1300. The system 1300 includes a mobility separator 1330 situated between the evaporator 448 and a particle counter 1332. The mobility separator 1330 includes a parallel plate dimensional electrical mobility separator. Particles are separated spatially within the electric field applied to the electrical mobility separator 330, enlarged through water condensation, and imaged by an imaging mobility analyzer 1334 (e.g., a CCD) of the particle counter 1332. The mobility separator 1330 distributes particles in accordance with their size. The condensation enlarges size-separated particles by liquid condensation while the particles are still within a gap of a mobility drift tube of the mobility separator. After being enlarged, the particles are illuminated by a light source of the imaging mobility analyzer 1334. At a pre-selected frequency, the position of all of the individual particles illuminated by the light source is captured by imaging mobility analyzer 1334. The image records the particle concentration at each position. Because the position is directly related to the particle size (or mobility), the particle size spectra is derived from the images recorded by the imaging mobility analyzer 1334.

One approach to exclude, remove, or reduce the NVR particles is to shift the CPC cut point to a larger size so that majority of the NVR particles smaller than the CPC cut points will not be counted. However, experimental data indicates that this method might not reduce the NVR particle count sufficiently in some cases and other means to further reduce the count may be helpful. One approach utilizes a diffusion screen.

FIG. 14 illustrates diffusion screen penetration, according to one example. An improved high sensitivity liquid particle counter can include a diffusion screen to remove, reduce, or exclude NVR particles. A diffusion screen can be favorably used when NVR particles are not sufficiently removed by the CPC cut point (D50).

FIG. 15 illustrates, by way of example, a block diagram of an embodiment of a portion of a particle counting system 1500 that includes multiple diffusion screens 1530, 1532 between the evaporator 448 and the particle counter 450. The diffusion screen 1530, 1532 can help ensure the particles provided to the particle counter 450 are within a specified range of sizes. A diffusion screen includes a set of fine-mesh screens configured to remove particles based on their Brownian motion. As particles pass through the fine-mesh screens, some particles collide with the screen wires and may stick to the wires because of surface-attractive forces between particles and wires. Since small particles have stronger Brownian motion than large particles, they are more likely to be removed by the device. By selecting a number of screens of suitably fine mesh, the device can selectively remove differently size particles. The penetration of a diffusion screen with various number of screens is shown in FIG. 14.

FIG. 16 illustrates the ultrapure water residue particle counts with and without a diffusion screen. In the illustrated example, three diffusion screens were used. With three screens, the penetrations are 15% and 50% at 10 and 21.5 nm. Note that the overall penetration of the measurement system is the combination of the CPC counting efficiency and the penetration of the diffusion screen. For example, considering the CPC counting efficiency is 50% at 10 nm, the overall penetration at 10 nm would be 50%*0.15=7.5% after taking the diffusion screen penetration into account. That is, with the diffusion screen, only 7.5% of the 10 nm particles will be counted by the CPC comparing to 50% without the screen. The reduction in residue particle counts is significant and is about a factor of 100×. Many (or most) of the particles that are removed by the screen are believed to be close to 10 nm in size and most, if not all, of these particles are NVR particles. Note that the factor of 100× is the combined effect of the all the particle sizes. The reductions are more significant for smaller size particles and negligible for particles larger than 100 nm.

FIG. 17 illustrates a block diagram of a method for the aerosol-based liquid particle counting method. The method 1700 as illustrated includes aerosolizing (e.g., by an atomizer having a liquid intake port and a gas intake port) a liquid (received at the liquid intake port), at operation 1740; separating, by a virtual impactor (having an inlet coupled to the atomizer and having a first output port and a second output port), droplets such that droplets smaller than a selected size cut point of the virtual impactor are directed to the first output port and those droplets larger than the selected size cut point of the virtual impactor are directed to the second output port, at operation 1742; evaporating, by an evaporator coupled to the first output port, the droplets from the first output port, at operation 1744; counting, by a particle counter coupled to the first output port downstream of the evaporator, particles in the droplets from the first output port, at operation 1746; and collecting (e.g., at a discharge reservoir coupled to the second output port) droplets from the second output port), at operation 1748. The method 1700 can further include filtering, by one or more diffusion screens coupled between the evaporator and the particle counter, to remove particles, of the particles from the first output port, less than a specified size of the diffusion screens. The method 1700 can further include receiving different portions of the particles from the droplets from the first output port at multiple input growth tubes including different particle size cut points coupled to the particle counter or multiple particle counters including different particle size cut points.

Various Notes

The above description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Geometric terms, such as "parallel", "perpendicular", "round", or "square", are not intended to require absolute mathematical precision, unless the context indicates otherwise. Instead, such geometric terms allow for variations due to manufacturing or equivalent functions. For example, if an element is described as "round" or "generally round," a component that is not precisely circular (e.g., one that is slightly oblong or is a many-sided polygon) is still encompassed by this description.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to allow the reader to quickly ascertain the nature of the technical disclosure, it is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

What is claimed is:

1. A measurement system comprising:
    an atomizer having a liquid intake port, a gas intake port and an orifice, the atomizer configured to aerosolize a liquid received at the liquid intake port resulting in aerosolized liquid;
    a virtual impactor having an inlet coupled to the atomizer and having a first output port and a second output port, the impactor configured to separate droplets such that droplets smaller than a selected size cut point are directed to the first output port and those droplets larger than the selected size cut point are directed to the second output port;
    an evaporator coupled to the first output port;
    a first particle counter coupled downstream of the evaporator and including a first input growth tube within the first particle counter, the first input growth tube configured with a first particle size cut point;
    a second particle counter coupled downstream of the evaporator and including a second input growth tube within the second particle counter, the second input growth tube configured with a second, different particle size cut point; and
    a discharge reservoir coupled to the second output port.

2. The system of claim 1, further comprising one or more diffusion screens coupled between the evaporator and the first and second particle counters.

3. The system of claim 1, wherein the liquid intake port is coupled to at least one of a filter or a pressure regulator.

4. The system of claim 3, wherein the filter includes a sintered metal media.

5. The system of claim 1, wherein the liquid intake port is coupled to a component series, the series including a filter, a valve, a pressure regulator, and a pressure gauge.

6. The system of claim 1, wherein the gas intake port is coupled to at least one of a filter or a valve.

7. The system of claim 1, wherein the atomizer utilizes an orifice to accelerate the gas flow to break out and aerosolize the liquid.

8. The system of claim 1, wherein the impactor is coupled to the output of the atomizer orifice and configured to direct some of the flow to discharge at the second output port.

9. The system of claim 8, where in the impactor and the atomizer are discrete components or integrated into a single component.

10. The system of claim 1, wherein the first output port is aligned transverse to a flow path between the orifice and the second output port.

11. The system of claim 1, wherein the atomizer further includes a makeup flow port to receive a dried and filtered makeup flow, and the atomizer is configured to merge the makeup flow and the aerosolized liquid to dry the aerosolized liquid into particles.

12. The system of claim 1, wherein the evaporator includes a heater between the first output port and the first and second particle counters.

13. The system of claim 1, wherein the evaporator is internal or external to the atomizer and includes a section of conduit with gas flowing therethrough.

14. The system of claim 1, further comprising a quench flow port coupled between the evaporator and the first and second particle counters.

15. The system of claim 1, wherein the particle counter is a condensation particle counter and configured to condense fluid on a particle to facilitate particle count measurement.

16. The system of claim 1, further comprising:
    a mobility separator situated between the evaporator and the first and second particle counters, and
    wherein the particle counter includes an imaging device configured to image mobility separated particles.

17. A measurement system comprising:
    an atomizer having a liquid intake port, a gas intake port and an orifice, the atomizer configured to aerosolize a liquid received at the liquid intake port resulting in aerosolized liquid;
    a virtual impactor having an inlet coupled to the atomizer and having a first output port and a second output port, the impactor configured to separate droplets such that droplets smaller than a selected size cut point are directed to the first output port and those droplets larger than the selected size cut point are directed to the second output port;
    an evaporator coupled to the first output port;
    a particle counter coupled downstream of the evaporator;
    a liquid collection reservoir coupled to the second output port, the liquid collection reservoir including a trap container, a level sensor, and a pump.

18. The system of claim 17, wherein the trap container is configured to separate liquid and gas.

19. The system of claim 18, wherein the trap container is configured to convey the liquid in a first direction and to convey gas in a second direction and wherein the first direction opposes the second direction.

20. The system of claim 18, wherein the level sensor is configured to provide a signal corresponding to liquid level.

21. The system of claim 18, wherein the pump is configured to operate in response to the signal from the level sensor.

22. The system of claim 18, wherein the liquid level sensor is a capacitive sensor.

23. The system of claim 17 further comprising:
    a differential mobility analyzer configured to separate particles from the evaporator by mobility and including multiple outputs configured to provide particles of respective, different mobilities, and
    wherein the first and second particle counters are coupled to respective outputs.

24. A method comprising:
    aerosolizing, by an atomizer having a liquid intake port, a gas intake port and an orifice, a liquid received at the liquid intake port;
    separating, by a virtual impactor having an inlet coupled to the atomizer and having a first output port and a second output port, droplets such that droplets smaller than a selected size cut point of the virtual impactor are directed to the first output port and those droplets larger than the selected size cut point of the virtual impactor are directed to the second output port;
    evaporating, by an evaporator coupled to the first output port, the droplets from the first output port;
    counting, by a particle counter coupled to the first output port downstream of the evaporator, particles in the droplets from the first output port larger than at least one particle size cut point determined by the settings of at least one particle counter growth tube;

collecting, at a discharge reservoir coupled to the second output port, droplets from the second output port; and receiving different portions of the particles from the droplets from the first output port at multiple input growth tubes within the particle counter, the multiple input growth tubes configured for different particle size cut points and each having its own dedicated counter.

25. The method of claim 24, further comprising filtering, by one or more diffusion screens coupled between the evaporator and the particle counter, to remove particles, of the particles from the first output port, less than a specified size of the diffusion screens.

\* \* \* \* \*